(12) United States Patent
Lin

(10) Patent No.: US 12,283,589 B2
(45) Date of Patent: Apr. 22, 2025

(54) SEMICONDUCTOR DEVICE INCLUDING CUMULATIVE SEALING STRUCTURES

(71) Applicant: TAIWAN SEMICONDUCTOR MANUFACTURING COMPANY, LTD., Hsinchu (TW)

(72) Inventor: Liang-Chen Lin, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 18/319,137

(22) Filed: May 17, 2023

(65) Prior Publication Data

US 2023/0290769 A1    Sep. 14, 2023

Related U.S. Application Data

(63) Continuation of application No. 17/214,275, filed on Mar. 26, 2021, now Pat. No. 11,676,958.

(51) Int. Cl.
*H01L 27/02* (2006.01)
*G06F 30/392* (2020.01)
(Continued)

(52) U.S. Cl.
CPC ........ *H01L 27/0207* (2013.01); *G06F 30/392* (2020.01); *H01L 23/5226* (2013.01);
(Continued)

(58) Field of Classification Search
CPC ............. H01L 27/0207; H01L 23/5226; H01L 23/562; H01L 23/564; H01L 23/585; G06F 30/392
(Continued)

(56) References Cited

U.S. PATENT DOCUMENTS

| 6,078,068 A | 6/2000 | Tamura |
| 7,260,442 B2 | 8/2007 | Hwang et al. |

(Continued)

FOREIGN PATENT DOCUMENTS

| TW | 200625505 | 7/2006 |
| TW | 201010017 | 3/2010 |
| TW | 201442165 | 11/2014 |

OTHER PUBLICATIONS

Office Action dated Dec. 7, 2021 from corresponding application No. DE 10 2021 108 343.5.

(Continued)

*Primary Examiner* — Tu-Tu V Ho
(74) *Attorney, Agent, or Firm* — Hauptman Ham, LLP

(57) ABSTRACT

A semiconductor device includes: a core region of core circuitry over a substrate; an input/output (I/O) region of interfacing circuitry over a substrate and coupled to the core region; a sealing ring having first, second and third sides, the sealing ring surrounding, and being isolated from, the core region and the I/O region; an intra-communication (intra-com) stack including intra-com segments in corresponding metallization layers which are stacked, the intra-com segments correspondingly extending between, and thereby coupling, the core region and the I/O region; and a first parapet on the intra-com stack and which extends from the first side to the third side of the sealing ring the first parapet being between, and isolated from each of, the core region and the I/O region.

20 Claims, 19 Drawing Sheets

(51) Int. Cl.
    *H01L 23/00*         (2006.01)
    *H01L 23/522*      (2006.01)
    *H01L 23/58*        (2006.01)

(52) U.S. Cl.
    CPC .......... *H01L 23/562* (2013.01); *H01L 23/564* (2013.01); *H01L 23/585* (2013.01)

(58) Field of Classification Search
    USPC ........................................................ 257/758
    See application file for complete search history.

(56) References Cited

U.S. PATENT DOCUMENTS

| | | |
|---|---|---|
| 8,334,582 B2 | 12/2012 | Jeng et al. |
| 9,256,709 B2 | 2/2016 | Yu et al. |
| 10,037,986 B2 | 7/2018 | Laine et al. |
| 2014/0035106 A1 | 2/2014 | Vu et al. |
| 2014/0040838 A1 | 2/2014 | Liu et al. |
| 2015/0278429 A1 | 10/2015 | Chang |
| 2016/0133583 A1 | 5/2016 | Chen et al. |
| 2018/0294230 A1 | 10/2018 | Dabral et al. |
| 2019/0206809 A1 | 7/2019 | Tatour et al. |
| 2020/0350209 A1 | 11/2020 | Chang et al. |
| 2022/0293433 A1* | 9/2022 | Dabral ................... H01L 24/19 |

OTHER PUBLICATIONS

Office Action dated Apr. 7, 2022 from corresponding application No. TW 11120337700 (pp. 1-3).

* cited by examiner

─ 500D

502'
form structures which also include 1st & 2nd stacks correspondingly in 1st & 2nd core regions, 3rd & 4th stacks correspondingly in 1st & 2nd I/O regions, and 1st & 2nd intracom stacks

528
isolate 1st to 4th sides of sealing ring from 1st & 2nd core regions, 1st & 2nd I/O regions and expendable region

530
arrange sealing ring as stack including conductive segments in each of metallization layers and via structures in each of interconnection layers

534
arrange each 1st intra-com segment to extend between and thereby couple, 1st core region and 1st I/O region

536
arrange each 2nd intra-com segment to extend between and thereby couple, 2nd core region and 2nd I/O region

538
arrange 1st parapet as stack including conductive segments in each of M_i+1 to M_k layers and via structures in each of corresponding interconnection layers

540
arrange 2nd parapet as stack including conductive segments in each of M_i+1 to M_k layers and via structures in each of corresponding interconnection layers

502'''
form structures which also include
1st & 2nd wall pads

572
arrange long axis of 1st wall pad to be coextensive with long axis of 5th parapet

574
arrange long axis of 2nd wall pad to be coextensive with long axis of 6th parapet

576
configure, relative to the long axis, perpendicular cross section of each of 1st & 2nd wall pads to have Y-shape

502''''
form structures which also include ring pad

580
arrange ring pad to have 1st, 2nd, 3rd & 4th portions corresponding to 1st, 2nd, 3rd & 4th sides of sealing ring

582
configure, relative correspondingly to a long axis of each of 1st to 4th portions of ring pad, perpendicular cross section of each of 1st to 4th portions of ring pad to have Y-shape

FIG. 5G

SEMICONDUCTOR DEVICE INCLUDING CUMULATIVE SEALING STRUCTURES

PRIORITY

The present application is a continuation application of U.S. patent application Ser. No. 17/214,275, filed on Mar. 26, 2021, now U.S. Pat. No. 11,676,958, issued Jun. 13, 2023, which is incorporated herein by reference in its entirety.

BACKGROUND

A package of integrated circuits ("ICs") ("IC package") includes one or more semiconductor devices. Each semiconductor device includes one or more integrated circuits. Each integrated circuit includes active devices, e.g., transistors, or the like, and passive devices, e.g., resistors, capacitors, or the like. Such active devices and passive devices are variously coupled to provide the functions of the corresponding integrated circuits. Typical interconnect structures include lateral interconnections, e.g., conductive segments in corresponding metallization layers, and vertical interconnections, e.g., via structures in corresponding interconnection layers and contact structures in a 'transistor layer.'

Typical fabrication of a package of ICs is as follows. The substrate is cut from an ingot of semiconductor material, e.g., of silicon, which has a flat, circular shape, and which is referred to as a wafer. Multiple semiconductor devices are formed on the wafer. A surface of the wafer is divided into small rectangular areas. A semiconductor device is formed on each of the rectangular areas. At some point during the fabrication, the semiconductor devices are separated by dicing (also referred to as scribing, sawing or cutting apart) the wafer. To prevent the dicing process from damaging the semiconductor devices, expendable (or sacrificial) areas are reserved between the rectangular areas which are at least partially consumed by the dicing process.

During an early stage of fabrication, one way in which to represent a semiconductor device is with a plan view diagram referred to as a layout diagram. Layout diagrams are generated in a context of design rules, which impose constraints on the placement of corresponding patterns in a layout diagram, e.g., geographic/spatial restrictions, connectivity restrictions, or the like. Typically, a set of design rules is specific to a process node by which will be fabricated a semiconductor device based on a resulting layout diagram. The design rule set compensates for variability of the corresponding process node. Such compensation increases the likelihood that an actual semiconductor device resulting from a layout diagram will be an acceptable counterpart to the virtual device on which the layout diagram is based.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

FIG. 2A' is a less-detailed version of FIG. 2A, in accordance with some embodiments.

FIGS. 5A-5G are corresponding flowcharts of corresponding methods of manufacturing a semiconductor device, in accordance with some embodiments.

DETAILED DESCRIPTION

Figure 1:
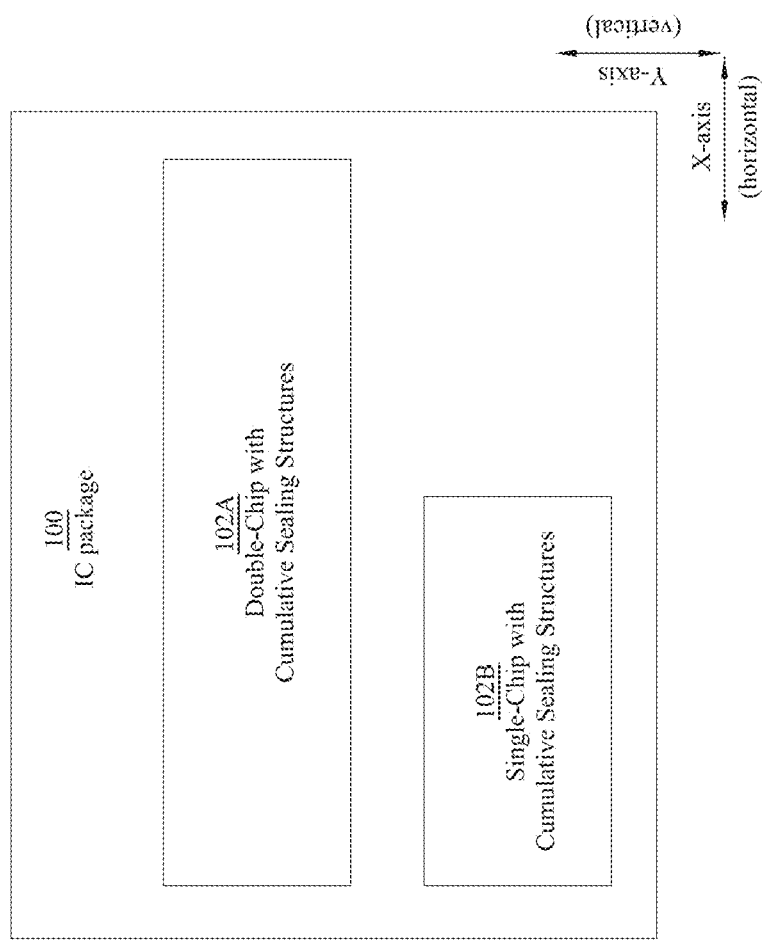
FIG. 1 is a block diagram of a semiconductor device, in accordance with at least one embodiment of the present disclosure.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a package of integrated circuits (ICs) (IC package) includes one or more double-chip semiconductor devices and/or one or more single-chip semiconductor devices. A double-chip semiconductor device includes first and second single chips. Accordingly, splitting apart (or dicing) a double-chip semiconductor device results in two single-chip semiconductor devices. In some embodiments, the double-chip semiconductor device includes cumulative sealing structures to protect the core regions and I/O regions from mechanical stress and/or moisture intrusion.

The first and second single chips of the double-chip semiconductor device correspondingly include: first and second core regions of core circuitry; and first and second input/output (I/O) regions of interfacing circuitry. The first and second I/O regions are coupled to each other and correspondingly coupled to the first and second core regions. The first core and first I/O regions are separated from the second core and second I/O regions by an expendable region. When the double-chip semiconductor device is split, a cut is made through the expendable region, which consumes at least a portion of the expendable area.

A double-chip semiconductor device further includes, among other things, metallization layers and interconnection layers which are interleaved between the metallization layers. The first I/O region is coupled to the first core region by a first intra-communication (intra-com) stack including first intra-com segments in a first subset of the metallization layers. Each of the first intra-com segments extends between, and thereby couple, the first core region and first I/O region. Similarly, the second I/O region is coupled to the second core region by a second intra-com stack which includes second intra-com segments in the first subset of the metallization layers. The first and second I/O regions are coupled by an inter-communication (inter-com) stack including inter-com segments in a second subset of the metallization layers. Each of the inter-com segments extends between, and thereby couples, the first and second I/O regions. Each of the inter-com segments extends through the expendable region.

In some embodiments, the cumulative sealing structures include a scaling ring and first, second, third and fourth parapets. The scaling ring surrounds, and is isolated from, the first and second core regions and the first and second I/O regions. Each of the first to fourth parapets extends from a first side to a third side of the sealing ring. The first parapet is on the first intra-com stack; and is between, and isolated from each of, the first core region and the first I/O region. As such, the first parapet seals the first core region from the first I/O region. The second parapet is on the second intra-com stack; and is between, and isolated from each of, the second core region and the second I/O region. As such, the second parapet seals the second core region from the second I/O region. The third parapet is between the first I/O region and the expendable region. The fourth parapet is between the second I/O region and the expendable region. Relative to a direction in which the metallization layers are stacked ("stacking direction"), each of the third and fourth parapets is formed between the inter-com stack and a substrate. Hence, relative to the stacking direction, and regarding a lower portion of the first I/O region which is below the inter-com stack, the third parapet seals the lower portion of the first I/O region from the expendable region. As the first parapet directly seals the first core region, and the third parapet indirectly seals the first core region, the first and third parapets are described as being cumulative. Also, hence, relative to the stacking direction, and regarding a lower portion of the second I/O region which is below the inter-com stack, the fourth parapet seals the lower portion of the second I/O region from the expendable region. As the second parapet directly seals the second core region, and the fourth parapet indirectly seals the second core region, the second and fourth parapets are described as being cumulative. In some embodiments, the first and second parapets extend from first to second locations correspondingly on the third and fourth parapets.

According to another approach, a double-chip semiconductor device is provided which lacks sealing structures that otherwise would correspond to the first and second parapets of at least some embodiments. When the double-chip semiconductor device according to the other approach is diced, the core region in each of the two resulting single-chip semiconductor devices is vulnerable to moisture intrusion coming through the corresponding I/O region. The moisture enters the single-chip through the remnant of the inter-com stack which remains after the dicing process. The remnant of the inter-com stack includes not only remnants of the inter-com segments in the first subset of metallization layers, but also remnants of corresponding interconnection layers. More particularly, moisture propagates through dielectric material in the remnants of the interconnection layers, through the corresponding portions of the interconnection layers which are in the I/O stack and onward to the portions of the interconnection layers in the core region. By contrast, according to some embodiments, the first and second parapets reduce, if not prevent, the moisture intrusion suffered according to the other approach, which improves reliability of the corresponding first and second single-chip semiconductor devices.

In some embodiments, the cumulative sealing structures further include fifth and sixth parapets, corresponding to first and second wall pads on the fifth and sixth parapets. Each of the fifth and sixth parapets is on the inter-com stack. The fifth parapet is aligned over the third parapet, and so is between the first I/O region and the expendable region. The sixth parapet is aligned over the fourth parapet, and so is between the second I/O region and the expendable region. Relative to the stacking direction, and regarding an upper portion of the first I/O region which is above the inter-com stack, the fifth parapet seals the upper portion of the first I/O region from the expendable region. Relative to the stacking direction, and regarding an upper portion of the second I/O region which is above the inter-com stack, the sixth parapet seals the upper portion of the second I/O region from the expendable region. According to the other approach, the double-chip semiconductor device is provided which lacks sealing structures that otherwise would correspond to the fifth and sixth parapets of at least some embodiments, and which lacks pad structures otherwise corresponding to the first and second wall pads of at least some embodiments. During the dicing process, the inter-com stack is subjected to mechanical stress, but the other approach lacks structures to mitigate such mechanical stress. By contrast, according to some embodiments, the first and second wall pads stacked correspondingly on the fifth and sixth parapets reduce the mechanical stress to which the inter-com stack is subjected during the dicing process, which improves reliability of the corresponding first and second single-chip semiconductor devices.

FIG. 1 is a block diagram of a package of integrated circuits (ICs) (IC package), in accordance with at least one embodiment of the present disclosure.

In FIG. 1, IC package 100 includes, among other things, a double-chip semiconductor device 102A and a single-chip semiconductor device 102B. A double-chip semiconductor device includes first and second single chips. Accordingly, splitting apart (or dicing) a double-chip semiconductor device results in two single-chip semiconductor devices. The double-chip semiconductor device includes cumulative sealing structures to protect against mechanical stress and/or moisture intrusion. The single-chip semiconductor device includes cumulative sealing structures to protect against mechanical stress and/or moisture intrusion.

Figure 2A:
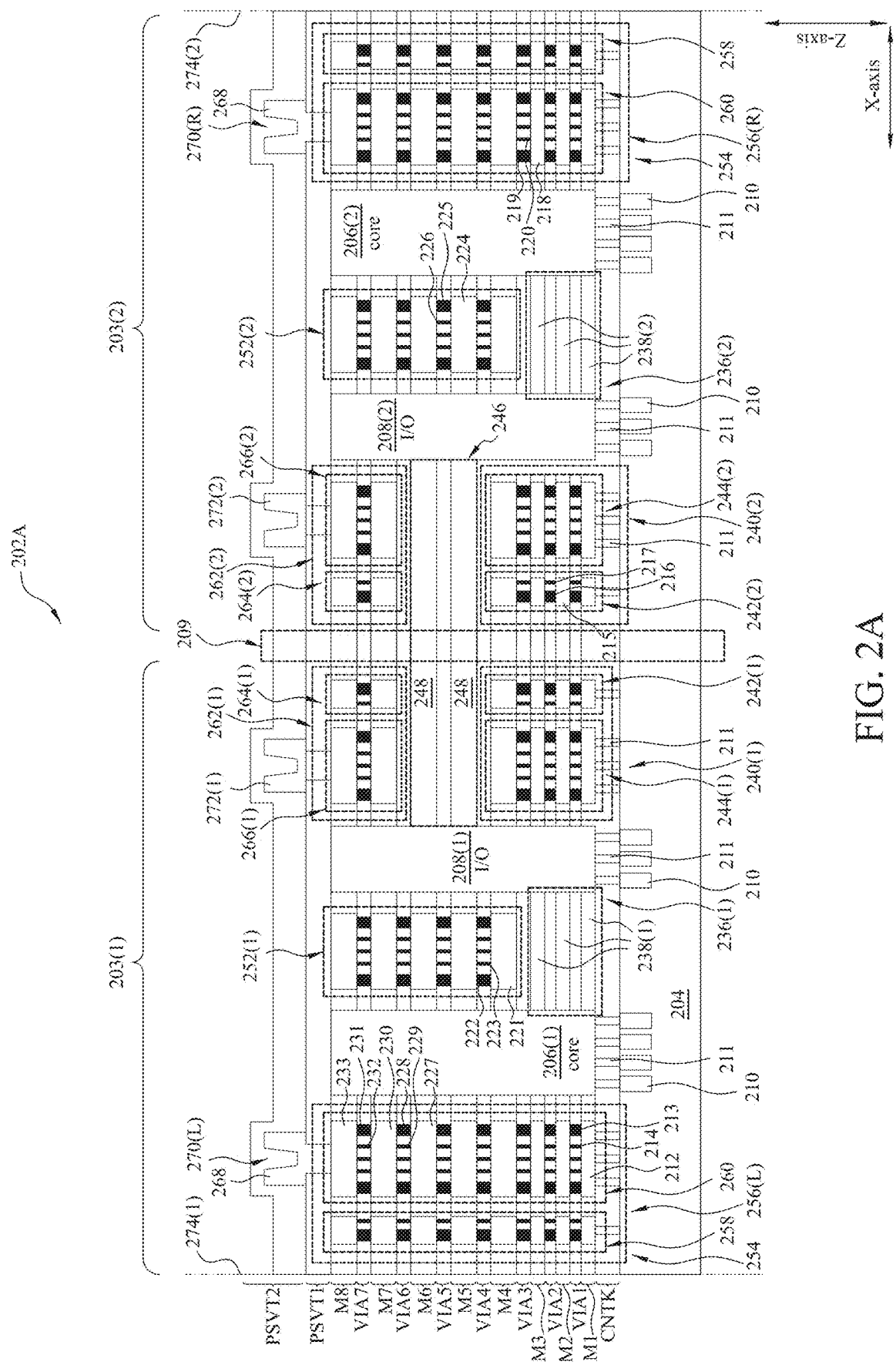
FIGS. 2A-2B are cross-sections of corresponding semiconductor devices, in accordance with some embodiments.
Figure 2A:
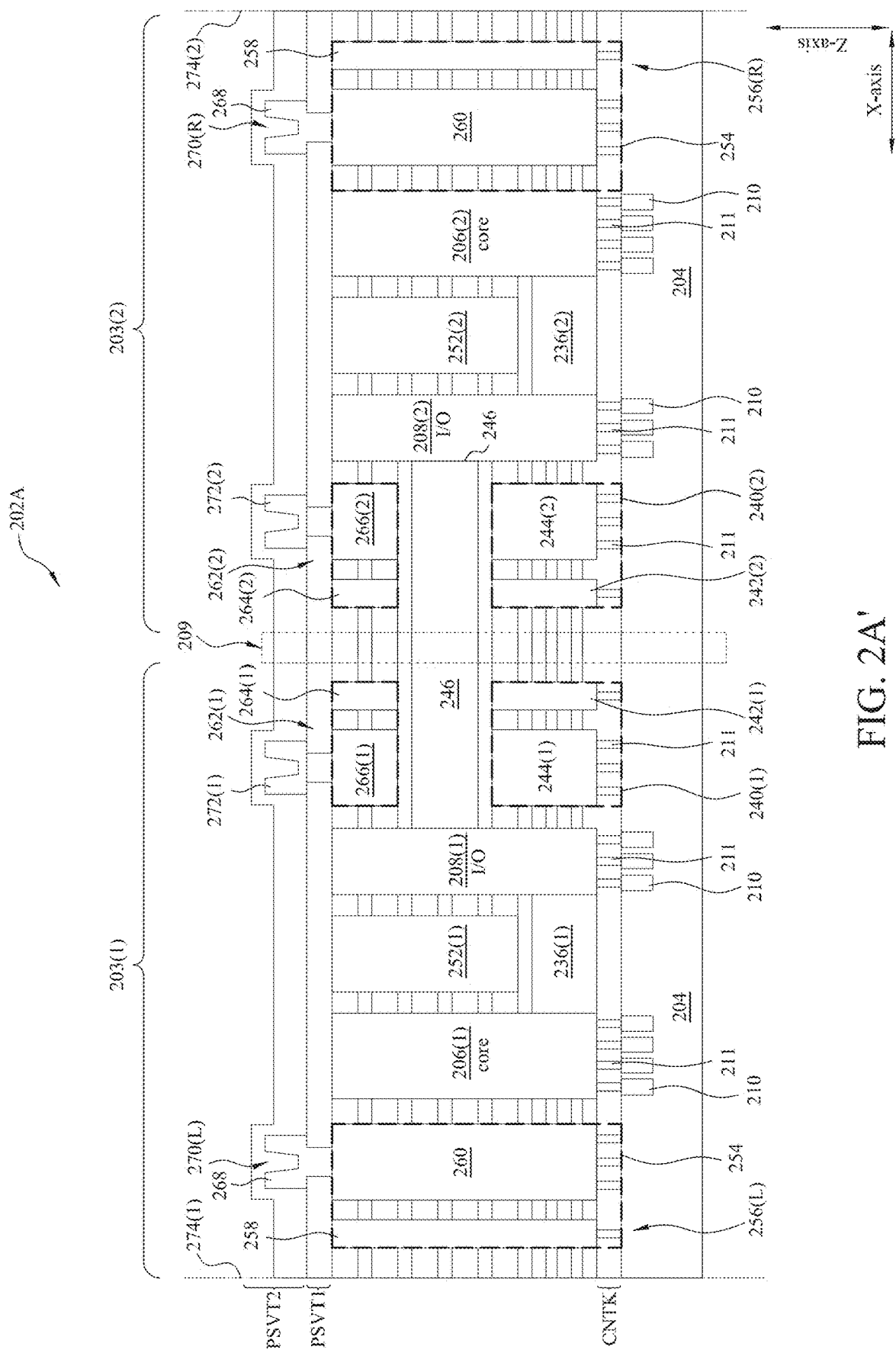

FIG. 2A is a cross-section of a semiconductor device 202A, in accordance with some embodiments.

FIG. 2A' is a less-detailed version of FIG. 2A, in accordance with some embodiments.

For purposes, e.g., of contrast with respect to FIG. 2A, FIG. 2A' emphasizes the larger structures of FIG. 2A with a result that FIG. 2A' is less-detailed than FIG. 2A. For example, whereas FIG. 2A shows numerous components as being included in parapet 252(1), FIG. 2A' shows parapet 252(1) but does not show the components included in parapet 252(1). For simplicity hereafter, reference is made FIG. 2A. Nonetheless, it is to be understood that much of the discussion of FIG. 2A applies equally to FIG. 2A'.

Semiconductor device 202A is a double-chip semiconductor device, e.g., double-chip semiconductor device 102A (FIG. 1). Semiconductor device 202A includes chips 203(1) and 203(2). Chips 203(1) and 203(2) are discussed in more detail below.

Semiconductor device 202A is a double-chip semiconductor device which includes a substrate 204. In some embodiments, substrate 204 is a semiconductor material. In some embodiments, substrate 204 includes silicon. In some embodiments, substrate is a doped semiconductor material.

In FIG. 2A, semiconductor device 202A further includes metallization layers, a contact layer and interconnection layers, where the interconnection layers are interleaved correspondingly between the metallization layers. A contact layer CNTK is over substrate 204. A first layer of metallization (layer M_1st) is over the contact CNTK layer. A first layer of interconnection (layer V_1st) is over the M_1st layer. FIG. 2A assumes a numbering convention in which M_1st layer and the V_1st are referred to correspondingly as M1 and VIA1. In some embodiments, the numbering convention assumes that the M_1st level and the V_1st level are referred to correspondingly as M0 and VIA0.

The metallization layers and the interconnection layers further include the following: A second layer of metallization (layer M2) is over the VIA1 layer. A second layer of interconnection (layer VIA2) is over the M2 layer. A third layer of metallization (layer M3) is over the VIA2 layer. A third layer of interconnection (layer VIA3) is over the M3 layer. A fourth layer of metallization (layer M4) is over the VIA3 layer. A fourth layer of interconnection (layer VIA4) is over the M4 layer. A fifth layer of metallization (layer M5) is over the VIA4 layer. A fifth layer of interconnection (layer VIA5) is over the M5 layer. A sixth layer of metallization (layer M6) is over the VIA5 layer. A sixth layer of interconnection (layer VIA6) is over the M6 layer. A seventh layer of metallization (layer M7) is over the VIA6 layer. A seventh layer of interconnection (layer VIA7) is over the M7 layer. An eighth layer of metallization (layer M8) is over the VIA7 layer. In FIG. 2A, layer M8 represents a top layer of metallization (layer M_top). While FIG. 2A shows either layers of metallization, in some embodiments, there are either fewer layers of metallization than eight or a greater number of layer of metallization than eight.

For simplicity of illustration in FIG. 2A, and except as noted below, each one of the conductive segments in a given layer of metallization is considered to be labeled with the same reference number, as follows: segments 212 in layer M1; segments 215 in layer M2; segments 218 in layer M3; segments 221 in layer M4; segment 224 in layer M5; segments 227 in layer M6; segments 230 in layer M7; and segments 233 in layer M8. Each of layers M1-M3 additionally includes conductive segments 238(1) and 238(2), as discussed below. Each of layers M5-M6 additionally includes conductive segments 248, as discussed below.

Also for simplicity of illustration in FIG. 2A, each of interconnection layers of VIA1-VIA7 are assumed to have two types of interconnection structures, via bars and discrete vias, as discussed below. For purposed of visual distinction, relative to the X-axis noted on FIG. 2A, via bars are consistently shown as being wider than discrete vias. Furthermore, for simplicity of illustration in FIG. 2A, each one of the via bars in a given layer of interconnection is considered to be labeled with the same first reference number, and each one of the discrete vias in the given layer of interconnection is considered to be labeled with the same reference second number, as follows: via bars 213 and discrete vias 214 in layer VIA1; via bars 216 and discrete vias 217 in layer VIA2; via bars 219 and discrete vias 220 in VIA3; via bars 222 and discrete vias 223 in VIA4; via bars 225 and discrete vias 226 in VIA5; via bars 228 and discrete vias 229 in VIA6; and via bars 231 and discrete vias 232 in VIA7.

Interstices of each of layers M1-M8 are spaces not filled with corresponding conductive segments, and are filled with corresponding interlayer dielectric (ILD) materials. Interstices of each of layers VIA1-VIA7 are spaces not filed with corresponding via structures, and are filled with corresponding interlayer dielectric (ILD) materials.

In terms of layers, semiconductor device 202A further includes a passivation layer PSVT1 over the M8 layer, and a second passivation layer PSVT2 over the PSVT1 layer.

In FIG. 2A, each of substrate 204, contact layer CNTK, metallization layers M1-M8, interconnection layers VIA1-VIA7, and passivation layers PSVT1-PSVT2 extends in first and second directions, the first and second directions being perpendicular. In some embodiments, the first and second directions correspondingly are the X-axis and the Y-axis. Contact layer CNTK, metallization layers M1-M8, interconnection layers VIA1-VIA7, and passivation layers PSVT1-PSVT2 are stacked in a third direction ("stacking direction"), the stacking direction being perpendicular to each of the first and second directions. In some embodiments in which the first and second directions correspondingly are the X-axis and the Y-axis, the third direction is the Z-axis.

Semiconductor device 202A further includes core regions 206(1) and 206(2), input/output (I/O) regions 208(1) and 208(2), and an expendable region 209. Each of core regions 206(1) and 206(2) includes corresponding core circuitry.

The core circuitry of each of core regions 206(1) and 206(2) includes corresponding segments in one or more of layers M1-M8 and corresponding via structures in corresponding layers VIA1-VIA7. The I/O circuitry of each of I/O regions 208(1) and 208(2) includes corresponding segments in one or more of layers M1-M8 and corresponding via structures in corresponding layers VIA1-VIA7. In addition, contact structures 211 are formed in the CNTK layer by which corresponding segments of core regions 206(1) and 206(2) in layer M1 are coupled to corresponding doped regions 210 in substrate 204.

Each of I/O regions 208(1) and 208(2) includes interfacing circuitry. In some embodiments, interfacing circuitry facilitates communication between core regions 206(1) and 206(2). In FIG. 2A, relative to the X-axis: expendable region 209 is between the I/O regions 208(1) and 208(2); I/O region 208(1) is between expendable region 209 and core region 206(1); and I/O region 208(2) is between expendable region 209 and core region 206(2). Each of core regions 206(1) and 206(2), I/O regions 208(1) and 208(2) and expendable region 209 has a corresponding footprint representing an area relative to the X-axis and the Y-axis (see FIGS. 3B-3F).

In FIG. 2A, semiconductor device 202A further includes a scaling ring 254 which surrounds (see top views of FIGS. 3B-3F), and is isolated from, core regions 206(1) and 206(2), I/O regions 208(1) and 208(2) and expendable region 209. Sealing ring 254 is isolated from core regions 206(1) and 206(2) and I/O regions 208(1) and 208(2).

Scaling ring 254 has a left side 256(L), a right side 256(R), a distal side 256(D) (see FIGS. 3B-3F, where the descriptor distal is relative to the bottom of the page containing FIGS. 3A-3B), and a proximal side 256(P) (again, see FIGS. 3B-3F, where the descriptor proximal is relative to the bottom of the page containing FIGS. 3B-3F). Left side 256(L) of scaling ring 254 is between core region 206(1) and a diced edge 274(1). Diced edged 274(1) is the result of having separated (or diced) semiconductor device 202A apart from other semiconductor devices on a wafer (see FIG. 4). Right side 256(R) of sealing ring 254 is between core region 206(2) and a diced edge 274(2).

Scaling ring 254 includes an inner wall 260 and an expendable outer wall 258. Each of walls 258 and 260 is arranged as a stack which includes segments in each of layers M1-M8, and via structures in each of layers VIA1-VIA7. There are two types of via structures in scaling ring 254, namely a discrete via and a via bar. Additional details regarding sealing rings including inner walls, an expendable outer walls, via bars and discrete vias are found in U.S. Pat. No. 8,334,582, granted Dec. 18, 2012, the entirety of which is hereby incorporated by reference.

More particularly, each of walls 258 and 260 includes: a segment 212 in layer M1; one or more via bars 213 and one or more discrete vias 214 in layer VIA1; a segment 215 in layer M2; one or more via bars 216 and one or more discrete vias 217 in layer VIA2; a segment 218 in layer M3; one or more via bars 219 and one or more discrete vias 220 in VIA3; a segment 221 in layer M4; one or more via bars 222 and one or more discrete vias 223 in VIA4; a segment 224 in layer M5; one or more via bars 225 and one or more discrete vias 226 in VIA5; a segment 227 in layer M6; one or more via bars 228 and one or more discrete vias 229 in VIA6; a segment 230 in layer M7; one or more via bars 231 and one or more discrete vias 232 in VIA7; and a segment 233 in layer M8. In some embodiments, contact structures 211 are formed in the CNTK layer by which corresponding segments 212 in inner wall 260 and expendable outer wall 258 of sides 256(L), 256(R), 256(D) and 256(P) of sealing ring 254 are coupled to substrate 204.

In some embodiments, relative to a distance along the X-axis and a distance along the Y-axis, a footprint of a discrete via has proportions which are approximately square. In some embodiments, a footprint of a discrete via is rectangular and has a long-axis-to-short axis size ratio of less than about two. A via bar is an extended version of a discrete via. In some embodiments, a footprint of a via bar has proportions which are rectangular, and a size of the short axis of the via bar is equal to about twice the size of a long axis of a discrete via, and a size of the long axis of the via bar is substantially greater than a size of the short axis of the via bar.

In some embodiments, for left side 256(L) of sealing ring 254: a size of the long axis of each of via bars 213, 216, 219, 222, 225, 228 and 231 in expendable outer wall 258 is equal to a size of the long axis of outer wall 258 in left side 256(L); and a size of the long axis of each of via bars 213, 216, 219, 222, 225, 228 and 231 in inner wall 260 is equal to a size of the long axis of inner wall 260 in left side 256(L). In some embodiments, for right side 256(R) of scaling ring 254: a size of the long axis of each of via bars 213, 216, 219, 222, 225, 228 and 231 in expendable outer wall 258 is equal to a size of the long axis of outer wall 258 in right side 256(R); and a size of the long axis of each of via bars 213, 216, 219, 222, 225, 228 and 231 in inner wall 260 is equal to a size of the long axis of inner wall 260 in right side 256(R). In some embodiments, for distal side 256(D) (see FIGS. 3B-3F) of sealing ring 254: a size of the long axis of each of via bars 213, 216, 219, 222, 225, 228 and 231 in expendable outer wall 258 is equal to a size of the long axis of outer wall 258 in distal side 256(D); and a size of the long axis of each of via bars 213, 216, 219, 222, 225, 228 and 231 in inner wall 260 is equal to a size of the long axis of inner wall 260 in distal side 256(D). In some embodiments, for proximal side 256(P) (see FIGS. 3B-3F) of scaling ring 254: a size of the long axis of each of via bars 213, 216, 219, 222, 225, 228 and 231 in expendable outer wall 258 is equal to a size of the long axis of outer wall 258 in proximal side 256(P); and a size of the long axis of each of via bars 213, 216, 219, 222, 225, 228 and 231 in inner wall 260 is equal to a size of the long axis of inner wall 260 in proximal side 256(P).

In some embodiments (not shown), a size of the short axis of each of via bars 213, 216, 219, 222, 225, 228 and 231 in expendable outer wall 258 is substantially equal to a size of the short axis of outer wall 258 in left side 256(L) with a result that wall 258 does not include corresponding discrete vias 214, 217, 220, 223, 226, 229 and 232; and a size of the short axis of each of via bars 213, 216, 219, 222, 225, 228 and 231 in inner wall 260 is substantially equal to a size of the short axis of inner wall 260 in left side 256(L) with a result that wall 260 does not include corresponding discrete vias 214, 217, 220, 223, 226, 229 and 232.

Semiconductor device 202A further includes a first intra-communication (intra-com) stack 236(1) and a second intra-com stack 236(2). Intra-com stack 236(1) includes intra-com segments 238(1) in each of layer M1 to an $(i)^{th}$ one of layers M2-M8 (layer M_i), where i is a positive integer. In FIG. 2A, i=3 and layer M_i is layer M3. In some embodiments, i is a value other than 3. Intra-com stack 236(2) includes intra-com segments 238(2) in each of layers M1 to M_i, where (again) layer M_i is M3 in FIG. 2A. Each intra-com segment 238(1) extends between, and thereby couples, a corresponding part of core region 206(1) and a corresponding part of I/O region 208(1). Each intra-com segment 238(2) extends between, and thereby couples, a corresponding part of core region 206(2) and a corresponding part of I/O region 208(2).

In FIG. 2A, semiconductor device 202A further includes parapets (or low walls) 252(1) and 252(2). Parapets 252(1) and 252(2) are correspondingly aligned over intra-com stacks 236(1) and 236(2). Each of parapets 252(1) and 252(2) extends from distal side 256(D) (see FIGS. 3B-3F) to proximal side 256(P) (see FIGS. 3B-3F) of sealing ring 254. Parapet 252(1) is between, and isolated from each of, core region 206(1) and I/O region 208(1). Parapet 252(2) is between, and isolated from each of, core region 206(2) and I/O region 208(2).

Each of parapets 252(1) and 252(2) includes segments in each of an $(i+1)^{th}$ layer of metallization (layer M_i+1) to an $(k)^{th}$ layer of metallization (layer M_k) among layers M2-M8, where k is a positive integer, and i<k. None of the metallization layers is between layer M_i and layer M_i+1. In FIG. 2A, again, i=3 so layer M_i+1 is layer M4. Also, in FIG. 2A, k=7 so layer M_k is M7. In some embodiments, k=8, so that M_k is M8, which is reflected in FIG. 2A by using phantom (dashed) lines to show segments 233, via bars 231 and discrete vias 232 in each of parapets 252(1) and 252(2).

More particularly, each of parapets 252(1) and 252(2) includes: a segment 221 in layer M4; one or more via bars 222 and one or more discrete vias 223 in VIA4; a segment 224 in layer M5; one or more via bars 225 and one or more discrete vias 226 in VIA5; a segment 227 in layer M6; one or more via bars 228 and one or more discrete vias 229 in VIA6; a segment 230 in layer M7; one or more via bars 231 and one or more discrete vias 232 in VIA7; and a segment 233 in layer M8.

In some embodiments, the proportions of footprints of via bars 222, 225, 228 and 231 in each of parapets 252(1) and 252(2) correspond to the proportions of footprints of via bars 222, 225, 228 and 231 in inner wall 260 of left side 256(L) and right side 256(R) of scaling ring 254. In some embodiments, the proportions of footprints of discrete vias 223, 226, 229 and 232 in each of parapets 252(1) and 252(2) correspond to the proportions of footprints of via bars 223, 226, 229 and 232 in inner wall 260 of left side 256(L) and right side 256(R) of scaling ring 254.

In FIG. 2A, semiconductor device 202A further includes parapets (or low walls) 240(1) and 240(2). Each of parapets 240(1) and 240(2) extends from distal side 256(D) (see FIGS. 3B-3F) to proximal side 256(P) (see FIGS. 3B-3F) of sealing ring 254. Parapet 240(1) is between, and isolated from each of, I/O region 208(1) and expendable region 209. Parapet 252(2) is between, and isolated from each of, I/O region 208(2) and expendable region 209.

Parapet 240(1) includes an inner wall 244(1) and an expendable outer wall 242(1). Parapet 240(2) includes an inner wall 244(2) and an expendable outer wall 242(2). Each of walls 242(1), 242(2), 244(1) and 244(2) is arranged as a stack which includes: segments in each of layers M1 to a $(p)^{th}$ layer of metallization (layer M_p) among layers M2-M8, where p is a positive integer and 2≤Sp; and at least one via bar and at least one discrete via in each of those among layers VIA2-VIA7 which correspond to layers M2 to M_p. In FIG. 2A, p=4 so that layer M_p is M4. In some embodiments, p is a positive integer other than p=4 which is also 2≤p.

More particularly, each of parapets 240(1) and 240(2) includes: a segment 212 in layer M1; one or more via bars 213 and one or more discrete vias 214 in layer VIA1; a segment 215 in layer M2; one or more via bars 216 and one or more discrete vias 217 in layer VIA2; a segment 218 in layer M3; one or more via bars 219 and one or more discrete vias 220 in VIA3; a segment 221 in layer M4. In some embodiments, contact structures 211 are formed in the CNTK layer by which corresponding segments 212 in inner walls 244(1) and 244(2), and expendable outer walls 242(1) and 242(2) of corresponding parapets 240(1) and 240(2) are coupled to substrate 204.

In some embodiments, the proportions of footprints of via bars 213, 216 and 219 in each of inner walls 244(1) and 244(2) of corresponding parapets 240(1) and 240(2) correspond to the proportions of footprints of via bars 213, 216 and 219 in inner wall 260 of left side 256(L) and right side 256(R) of scaling ring 254. In some embodiments, the proportions of footprints of discrete vias 214, 217 and 220 in each of inner walls 244(1) and 244(2) of corresponding parapets 240(1) and 240(2) correspond to the proportions of footprints of discrete vias 214, 217, 220 and 223 in inner wall 260 of left side 256(L) and right side 256(R) of sealing ring 254. In some embodiments, the proportions of footprints of via bars 213, 216 and 219 in each expendable outer walls 242(1) and 242(2) of corresponding parapets 240(1) and 240(2) correspond to the proportions of footprints of via bars 213, 216 and 219 in expendable outer wall 258 of left side 256(L) and right side 256(R) of sealing ring 254. In some embodiments, the proportions of footprints of discrete vias 214, 217 and 220 in each of expendable outer walls 244(1) and 244(2) of corresponding parapets 240(1) and 240(2) correspond to the proportions of footprints of discrete vias 214, 217, 220 and 223 in expendable outer wall 258 of left side 256(L) and right side 256(R) of scaling ring 254.

Semiconductor device 202A further includes an inter-communication (inter-com) stack 246. Inter-com stack 246 includes inter-com segments 248 in each of a $(p+1)^{th}$ layer of metallization (layer M_p+1) to a $(q)^{th}$ layer of metallization (layer M_q) among layers M2-M8, where q is a positive integer and p<q. In FIG. 2A, p=4, q=6, the M_p+1 layer is M5 and layer M_q is layer M6. In some embodiments, q is a value other than i=6. Inter-com stack 246 includes inter-com segments 248 in each of layers M_p+1 to M_i, where (again) layer M_i is M3 in FIG. 2A. Each intra-com segment 246 extends between, and thereby couples, a corresponding part of I/O region 208(1) and a corresponding part of I/O region 208(2).

In FIG. 2A, semiconductor device 202A further includes parapets (or low walls) 262(1) and 262(2). Each of parapets 262(1) and 262(2) extends from distal side 256(D) (see FIGS. 3B-3F) to proximal side 256(P) (see FIGS. 3B-3F) of sealing ring 254. Parapet 262(1) is between, and isolated from each of, I/O region 208(1) and expendable region 209. Parapet 262(2) is between, and isolated from each of, I/O region 208(2) and expendable region 209.

Parapet 262(1) includes an inner wall 266(1) and an expendable outer wall 264(1). Parapet 262(2) includes an inner wall 266(2) and an expendable outer wall 264(2). Each of walls 264(1), 264(2), 266(1) and 266(2) is arranged as a stack which includes segments in each of an $(q+1)^{th}$ layer of metallization (layer M_q+1) to an top layer of metallization (layer M_top) among layers M3-M8; and at least one via bar and at least one discrete via in each of those among layers VIA3-VIA7 which correspond to layers M_q+1 to M_top. None of the metallization layers is between layer M_q and layer M_q+1. In FIG. 2A, again, i=6 so layer M_q+1 is layer M7. Also, in FIG. 2A, layer M_top is M8. More particularly, each of parapets 240(1) and 240(2) includes: a segment 230 in layer M7; one or more via bars 231 and one or more discrete vias 232 in VIA7; and a segment 233 in layer M8.

In some embodiments, the proportions of the footprints of via bars 231 in each of inner walls 266(1) and 266(2) of corresponding parapets 262(1) and 262(2) correspond to the proportions of footprints of via bars 231 in inner wall 260 of left side 256(L) and right side 256(R) of sealing ring 254. In some embodiments, the proportions of footprints of discrete vias 232 in each of inner walls 266(1) and 266(2) of corresponding parapets 262(1) and 262(2) correspond to the proportions of footprints of discrete vias 232 in inner wall 260 of left side 256(L) and right side 256(R) of sealing ring 254. In some embodiments, the proportions of footprints of via bars 231 in each of expendable outer walls 264(1) and 264(2) of corresponding parapets 262(1) and 262(2) correspond to the proportions of footprints of via bars 231 in expendable outer wall 258 of left side 256(L) and right side 256(R) of sealing ring 254. In some embodiments, the proportions of footprints of discrete vias 232 in each of expendable outer walls 264(1) and 264(2) of corresponding parapets 262(1) and 262(2) correspond to the proportions of footprints of discrete vias 232 in expendable outer wall 258 of left side 256(L) and right side 256(R) of scaling ring 254.

In FIG. 2A, semiconductor device 202A further includes a ring pad 268 on sealing ring 254.

Figure 3A:
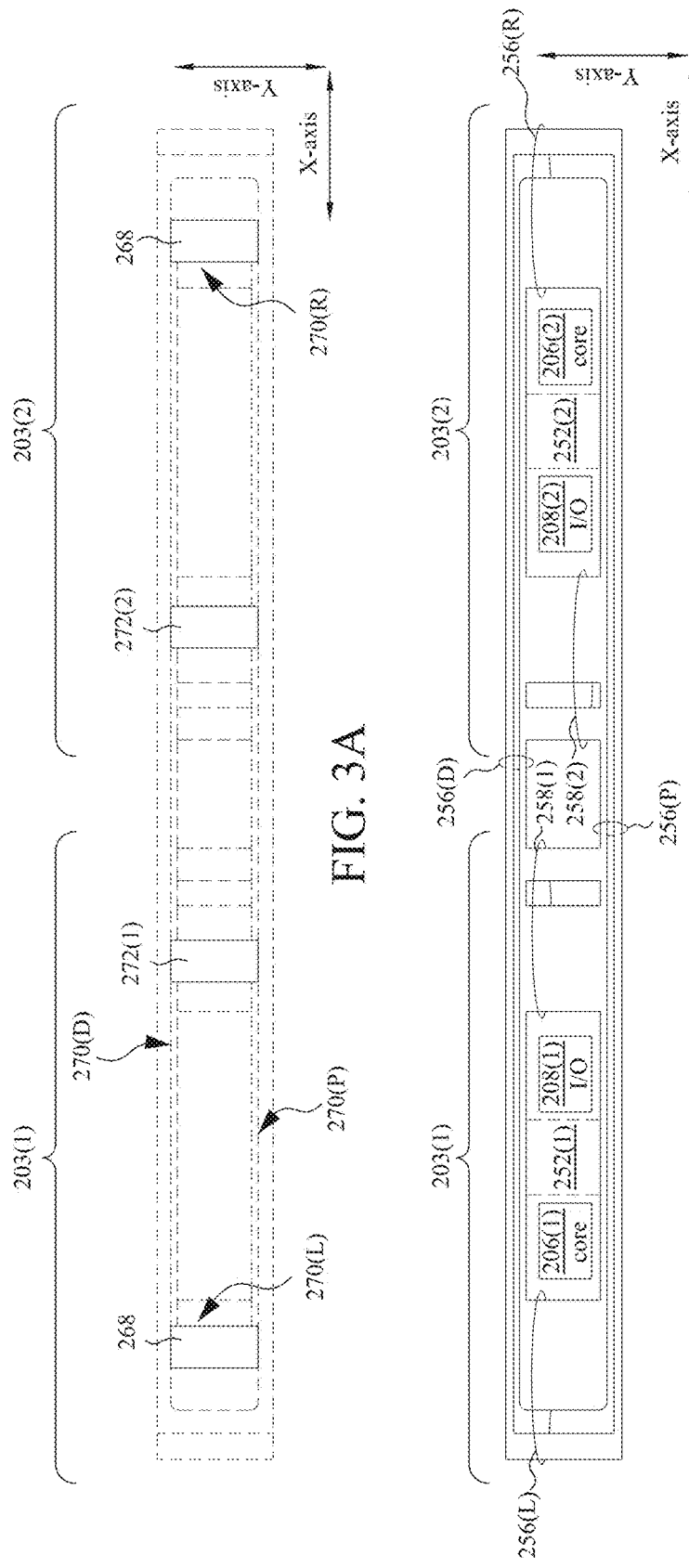
FIGS. 3A-3F are corresponding top views (plan views) of corresponding layers of a semiconductor device, in accordance with some embodiments.

Ring pad 268 has a left side 270(L), a right side 270(R), a distal side 270(D) (see FIG. 3A, where the descriptor distal is relative to the bottom of the page containing FIG. 3A), and a proximal side 270(P) (again, see FIG. 3A, where the descriptor proximal is relative to the bottom of the page containing FIG. 3A). Sides 270(L), 270(R), 270(D) and 270(P) of ring pad 268 correspond to sides 256(L), 256(R), 256(D) and 256(P) of scaling ring 254. First and second portions of ring pad 268 are correspondingly in passivation layers PSVT1 and PSVT2.

Relative to long axes of sides 270(L), 270(R), 270(D) and 270(P) of ring pad 268, a perpendicular cross-section of sides 270(L), 270(R), 270(D) and 270(P) has a Y-shape. In some embodiments, a material forming ring pad 268 includes aluminum. In some embodiments, a benefit of ring pad 268 is that it helps sealing ring 254 reduce mechanical stress associated with the dicing process. Additional details regarding ring pads are found in U.S. Pat. No. 8,334,582, granted Dec. 18, 2012, the entirety of which is (again) hereby incorporated by reference.

Again, semiconductor device 202A includes chips 203(1) and 203(2). Chip 203(1) includes: core region 206(1); I/O region 208(1); left side 256(L), a portion of distal side 256(D) and a portion of proximal side 256(P) of sealing ring 254; left side 270(L), a portion of distal side 270(D) and a portion of proximal side 270(P) of ring pad 268; intra-com stack 236(1); parapet 252(1); parapet 240(1); a portion of inter-com stack 246; parapet 262(1); wall pad 272(1); and a portion of expendable region 209. Chip 203(2) includes: core region 206(2); I/O region 208(2); right side 256(R), a portion of distal side 256(D) and a portion of proximal side 256(P) of scaling ring 254; right side 270(L), a portion of distal side 270(D) and a portion of proximal side 270(P) of ring pad 268; intra-com stack 236(2); parapet 252(2); parapet 240(2); a portion of inter-com stack 246; parapet 262(2); wall pad 272(2); and a portion of expendable region 209.

According to another approach, a double-chip semiconductor device is provided which lacks sealing structures that otherwise would correspond to the parapets 252(1) and 252(2) of at least some embodiments. When the double-chip semiconductor device according to the other approach is diced, the core region in each of the two resulting single-chip semiconductor devices is vulnerable to moisture intrusion coming through the corresponding I/O region. The moisture enters the single-chip through the remnant of the inter-com stack which remains after the dicing process. The remnant of the inter-com stack includes not only remnants of the inter-com segments in the first subset of metallization layers, but also remnants of corresponding interconnection layers. More particularly, moisture propagates through dielectric material in the remnants of the interconnection layers, through the corresponding portions of the interconnection layers which are in the I/O stack and onward to the portions of the interconnection layers in the core region. By contrast, according to some embodiments, parapets 252(1) and 252(2) reduce, if not prevent, the moisture intrusion suffered according to the other approach, which improves reliability of the corresponding single-chip semiconductor device which includes chip 203(1) (see single-chip semiconductor device 202B in FIG. 2B) and the corresponding single-chip semiconductor device (not shown) which includes chip 203(2).

In FIG. 2A, semiconductor device 202A further includes wall pads 272(1) and 272(2) on corresponding parapets 262(1) and 262(2).

Each of wall pads 272(1) and 272(2) extends from distal side 270(D) (see FIG. 3A) to proximal side 270(P) (see FIG. 3A) of ring pad 268. First and second portions of each of wall pads 272(1) and 272(2) are correspondingly in passivation layers PSVT1 and PSVT2. A long axis of wall pad 272(1) is substantially aligned parallel to a long axis of wall 266(1). A long axis of wall pad 272(2) is substantially aligned parallel to a long axis of wall 266(2).

Relative to long axes of each of wall pads 272(1) and 272(2), a perpendicular cross-section of each of wall pads 272(1) and 272(2) has a Y-shape. In some embodiments, a material forming each of wall pads 272(1) and 272(2) includes aluminum. In some embodiments, a benefit of each of wall pads 272(1) and 272(2) is that wall pads 272(1) and 272(2) help each of corresponding parapets 262(1) and 262(2) reduce mechanical stress associated with the dicing process. Additional details regarding wall pads are found in U.S. Pat. No. 8,334,582, granted Dec. 18, 2012, the entirety of which is (again) hereby incorporated by reference.

According to another approach, a double-chip semiconductor device is provided which lacks sealing structures that otherwise would correspond to parapets 262(1) and 262(2) of at least some embodiments, and which lacks pad structures otherwise corresponding to wall pads 272(1) and 272(2) of at least some embodiments. During the dicing process, the inter-com stack is subjected to mechanical stress, and the other approach lacks structures to mitigate such mechanical stress. By contrast, according to some embodiments, wall pads 272(1) and 272(2) stacked correspondingly on parapets 262(1) and 262(2) reduce the mechanical stress to which inter-com stack 246 is subjected during the dicing process, which improves reliability of the corresponding single-chip semiconductor device which includes chip 203(1) (see single-chip semiconductor device 202B in FIG. 2B) and the corresponding single-chip semiconductor device (not shown) which includes chip 203(2).

Figure 2B:
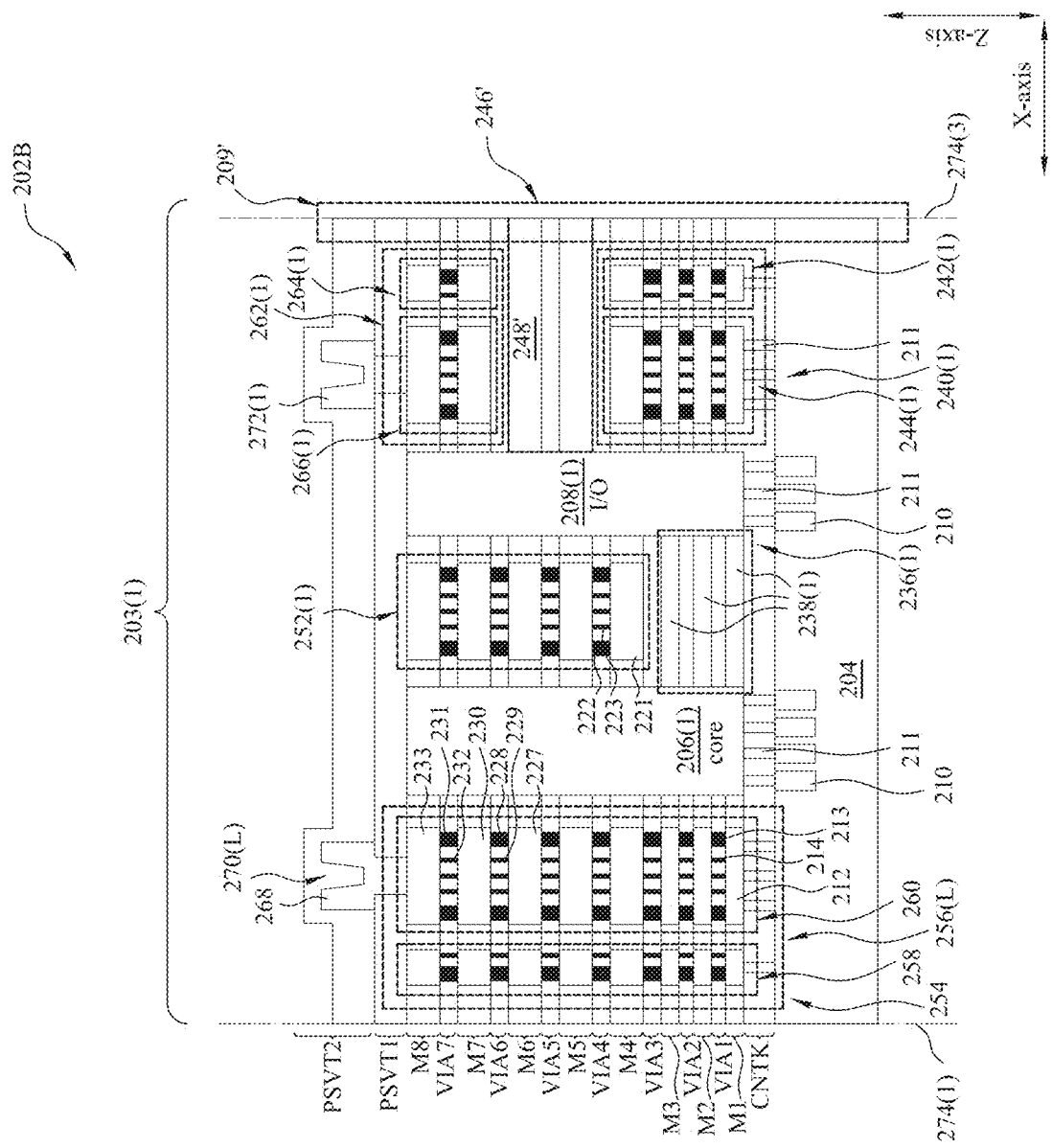

FIG. 2B is a cross-section of a semiconductor device 202B, in accordance with some embodiments.

Semiconductor device 202B is a single-chip semiconductor device which includes chip 203(1). Semiconductor device 202B results from having split semiconductor device 202A in half by dicing through expendable region 209 of semiconductor device 202A, resulting in diced edge 274(3) of semiconductor device 202B.

Chip 203(1) includes: core region 206(1); I/O region 208(1); left side 256(L), a portion of distal side 256(D) and a portion of proximal side 256(P) of sealing ring 254; left side 270(L), a portion of distal side 270(D) and a portion of proximal side 270(P) of ring pad 268; intra-com stack 236(1); parapet 252(1); parapet 240(1); a remnant 246' of inter-com stack 246; parapet 262(1); wall pad 272(1); and a remnant 209' of expendable region 209. Remnant 246' of inter-com stack 246 includes remnants 248' of segments 248.

FIGS. 3A-3F are corresponding top views of corresponding layers of a semiconductor device, in accordance with some embodiments.

In more detail, FIGS. 3A-3F are corresponding top views of corresponding layers of a semiconductor device of semiconductor device 202A of FIG. 2A. Though named using 3-series numbers, FIGS. 3A-3F are annotated with the 2-series numbers of FIG. 2A.

More particularly, FIG. 3A is a top view of passivation layer PSVT1 of semiconductor device 202A of FIG. 2A. For simplicity, FIG. 3A does not show ILD material. For context, FIG. 3A shows structures in underlying layer M8 using phantom (dashed) lines.

Figure 3B:
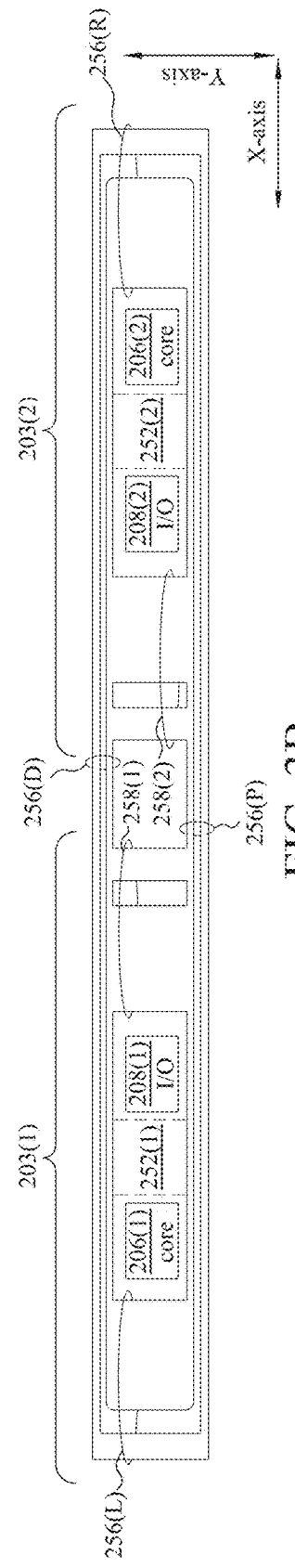
Figure 3C:
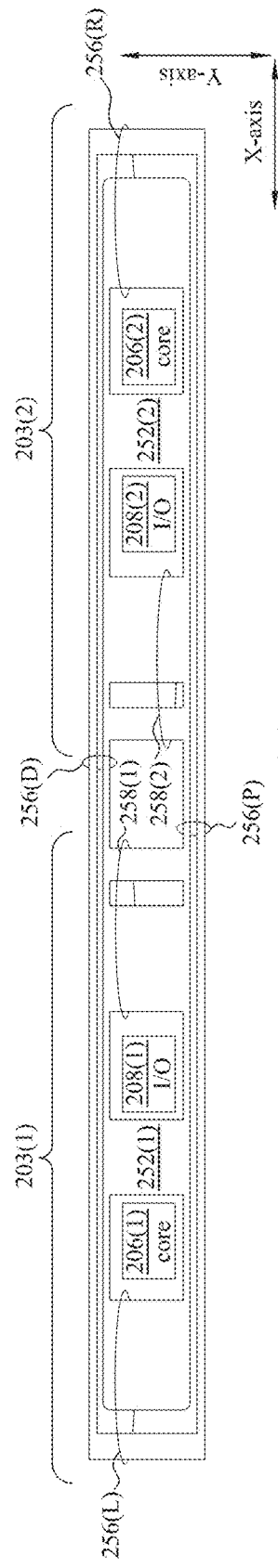
Figure 3D:
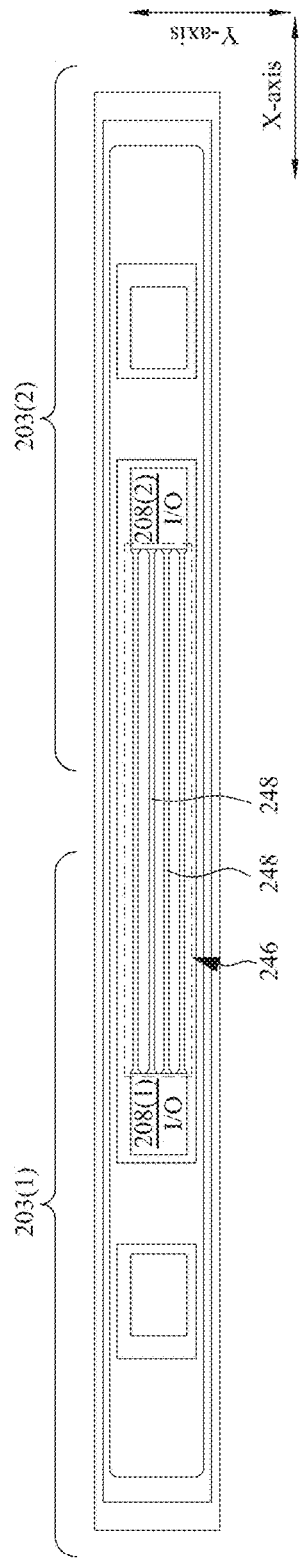
Figure 3E:
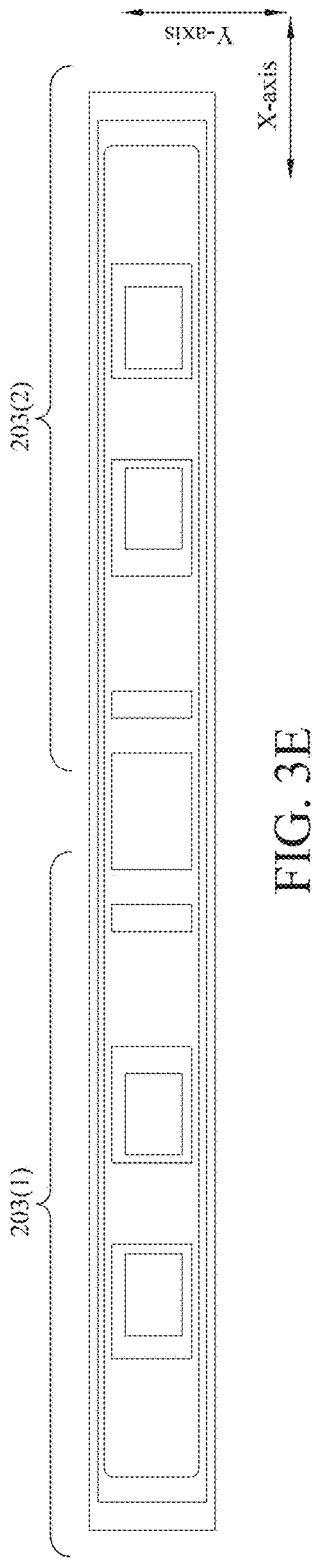
Figure 3F:
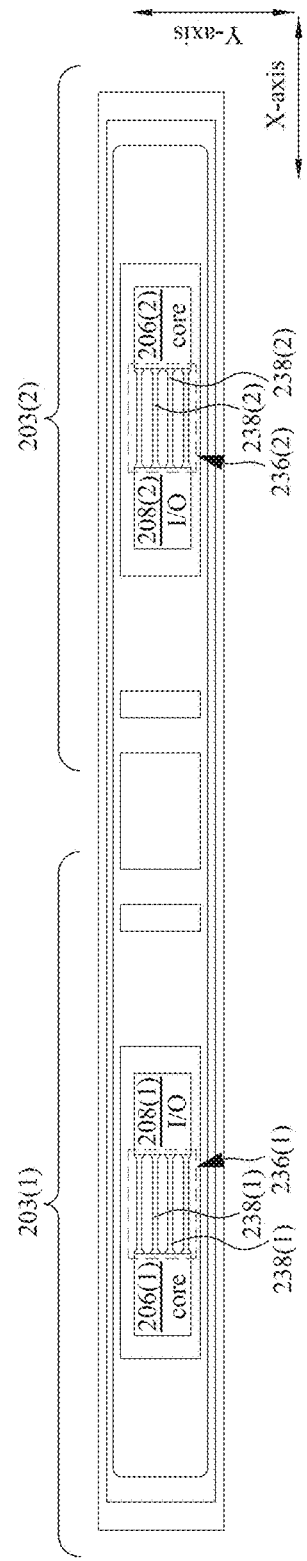

Also more particularly, FIG. 3B is a top view of layer M8 of semiconductor device 202A of FIG. 2A. FIG. 3C is a top view of layer M7 of semiconductor device 202A of FIG. 2A. FIG. 3D is a top view of each of layers M5 and M6 of semiconductor device 202A of FIG. 2A. FIG. 3E is a top view of layer M4 of semiconductor device 202A of FIG. 2A. FIG. 3F is a top view of each of layers M1, M2 and M3 of semiconductor device 202A of FIG. 2A.

Figure 4:
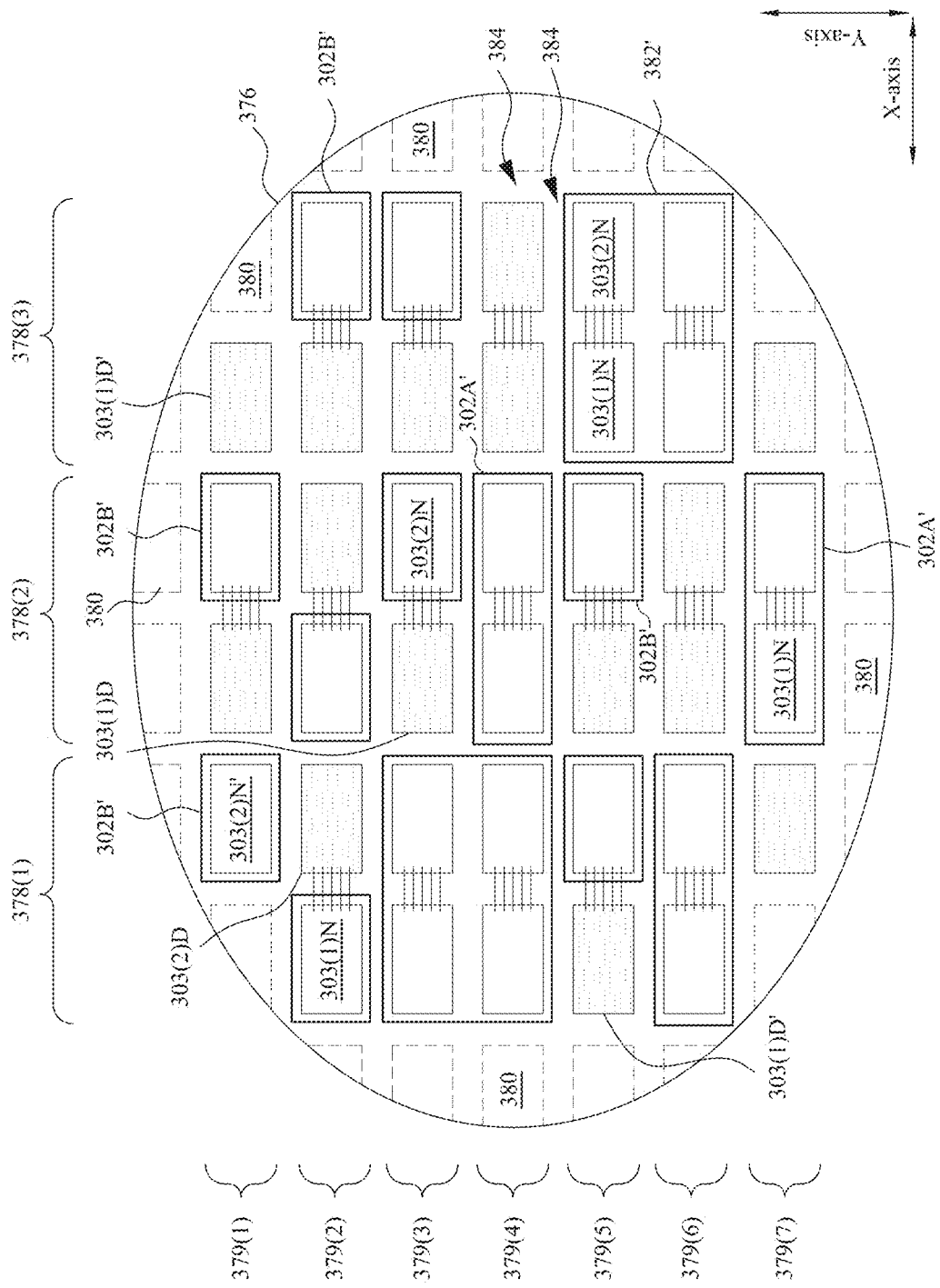
FIG. 4 is a top view (plan view) of a wafer, in accordance with some embodiments.

FIG. 4 is a top view of a wafer 376, in accordance with some embodiments.

Wafer 376 includes multiple semiconductor devices 302A', where the apostrophe indicates a pre-dicing state. To prevent the dicing process from damaging semiconductor devices 302A', expendable (or sacrificial) areas 384 are reserved between semiconductor devices 302A'. Expendable areas 384 are at least partially consumed by the dicing process. Wafer 376 is organized into columns 781(1)-378(3) and rows 379(1)-379(7) of semiconductor devices 302A'. Wafer 376 also includes areas 380 which are not large enough to accommodate an instance of semiconductor device 302A.

In FIG. 4, it is assumed that test has been conducted to determine which, if any, of chips 303(1) and 303(2), in each semiconductor device 302A, is defective. The reference number of a defective chip is appended with the parenthetical "(D)", e.g., see defective chip 303(1)(D) at the intersection of column 378(1) and row 379(5). Non-defective chips are appended with the parenthetical "(N)", e.g., non-defective chip 303(3)(N) at the intersection of column 378(2) and row 379(3). If one of the two chips in a given instance semiconductor 302A is defective, then the given instance of semiconductor 302A is designated to be split apart, with the remaining non-defective chip representing semiconductor device 302B', where the apostrophe indicates a pre-dicing state.

A boundary 382' indicates two adjacent instances of semiconductor device 302A which are designated not to be split apart by the dicing process. Each semiconductor device 302A within boundary 382' has two non-defective chips.

Figure 5A:
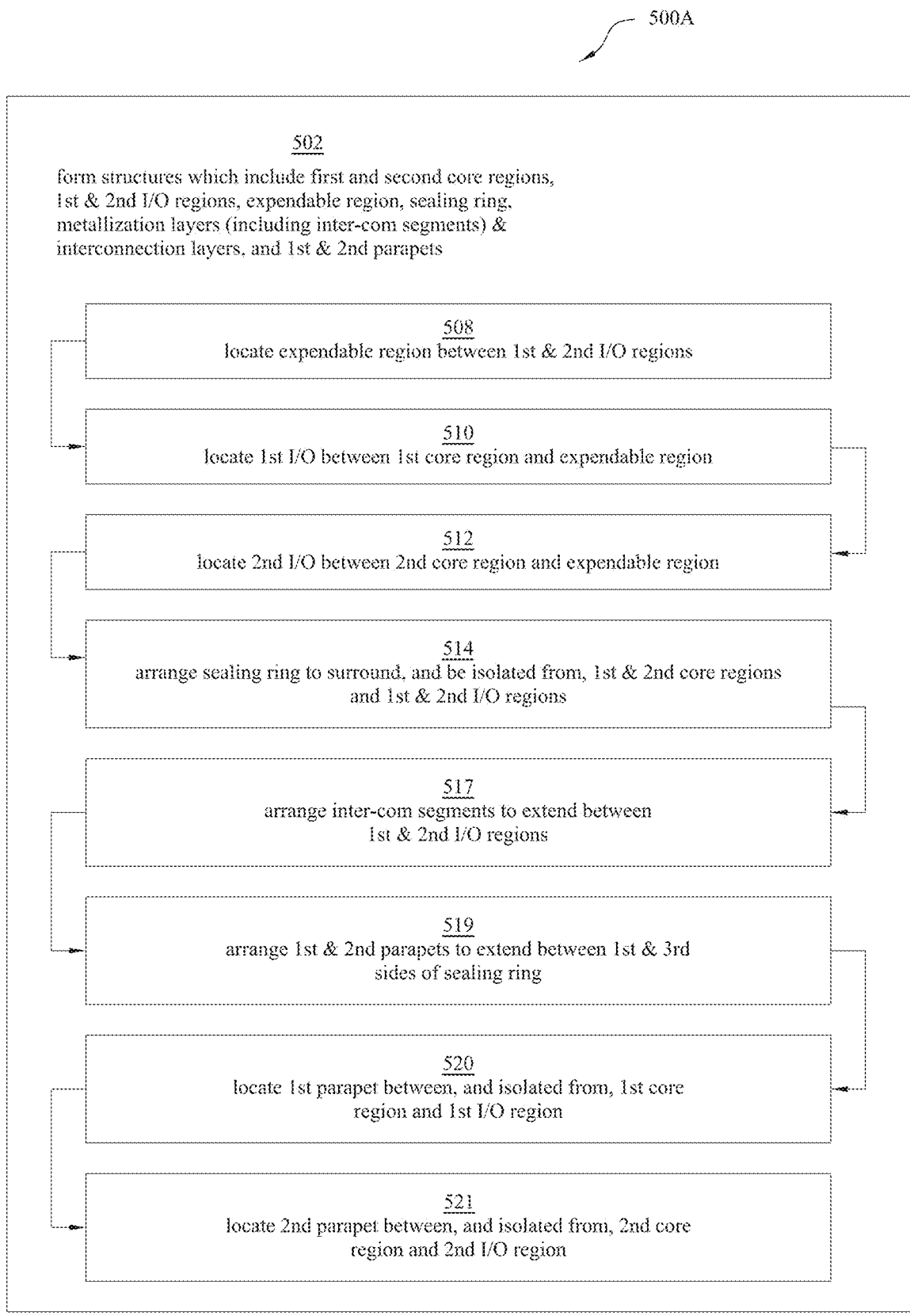

FIG. 5A is a flowchart of a method 500A of manufacturing a semiconductor device, in accordance with some embodiments.

Method 500A includes block 502. Block 502 itself includes blocks 508, 510, 512, 514, 517, 519, 520 and 521. At block 502, first & second core regions, first & second I/O regions, an expendable region, a sealing ring, form metallization layers (including intercommunication (inter-com) segments) & interconnection layers, and 1st & 2nd parapets are formed incrementally using corresponding photolithographic fabrication processes (see FIG. 8). Examples of the first and second core regions are corresponding core regions 206(1) and 206(2). Examples of the first and second I/O regions are corresponding I/O regions 208(1) and 208(2). An example of the expendable region is expendable region 509. An example of the sealing ring is sealing ring 254. Examples of the metallization layers include layers M1-M8 of FIG. 2A. An example of the subset of metallization layers is M5-M6, and examples of the inter-com segments are inter-com segments 248. Examples of the interconnection layers include layers VIA1-VIA7 of FIG. 2A. Examples of the first and second parapets are corresponding parapets 252(1) and 252(2).

During formation of the noted structures by block 502, spatial relationships between the noted structures are also established. Blocks 508, 510, 512, 514, 517, 519, 520 and 521, which (again) are included in block 502, represent how the spatial relationships are established. For purposes of discussion, the blocks in block 502 are discussed in the sequence 508, 510, 512, 514, 517, 519, 520 and 521. However, in some embodiments, other sequences of blocks 508, 510, 512, 514, 517, 519, 520 and 521 are contemplated. Hence, the sequence 508, 510, 512, 514, 517, 519, 520 and 521 is not intended to be limiting. In some embodiments, block 502 is accomplished with one or more blocks (not described) in addition to blocks 508, 510, 512, 514, 517, 519, 520 and 521.

At block 508, the expendable region is located between the first and second I/O regions. An example of the expendable region being located between the first and second I/O regions is expendable region 209, which is located between I/O regions 208(1) and 208(2). From block 508, flow proceeds to block 510.

At block 510, the first I/O region is located between the first core region and the expendable region. An example of the first I/O region being located between the first core region and the expendable region is I/O region 208(1), which is located between core region 206(1) and expendable region 209. From block 510, flow proceeds to block 512.

At block 512, the second I/O region is located between the second core region and the expendable region. An example of the second I/O region being located between the second core region and the expendable region is I/O region 208(2), which is located between core region 206(2) and expendable region 209. From block 512, flow proceeds to block 514.

At block 514, the sealing ring is arranged to surround, and be isolated from, the first and second core regions and the first and second I/O regions. An example of the sealing ring being arranged to surround, and be isolated from, the first and second core regions, the first and second I/O regions and the expendable region is sealing ring 254, which has left 256(L), right 256(R), distal 256(D) and proximal 256(P) sides that surround core regions 206(1) and 206(2) and I/O regions 208(1) and 208(2). From block 514, flow proceeds to block 517.

At block 517, the inter-com segments are arranged to extend between, and thereby couple, corresponding portions of the first and second I/O regions. Examples of the inter-com segments being arranged to extend between the first and second I/O regions are inter-com segments 248, which extend between corresponding portions of I/O region 208(1) and 208(2). From block 517, flow proceeds to block 519.

At block 519, the first and second parapets are arranged to extend between first and third walls of the sealing ring. Examples of the first and second parapets being arranged to extend between first and third walls of the sealing ring include corresponding parapets 252(1) and 252(2), each of which extends from distal side 256(D) to proximal side 256(P) of scaling ring 254. From block 519, flow proceeds to block 520.

At block 520, the first parapet is located between, and isolated from, the first core region and the first I/O region. An example of the first parapet being located between, and isolated from, the first core region and the first I/O region is parapet 262(1). Parapet 262(1) is between, and isolated from, core region 206(1) and I/O region 208(1). From block 520, flow proceeds to block 521.

At block 521, the second parapet is located between, and isolated from, the second core region and the second I/O region. An example of the second parapet being located between, and isolated from, the second core region and the second I/O region is parapet 262(2). Parapet 262(2) is between, and isolated from, core region 206(2) and I/O region 208(2).

Figure 5B:
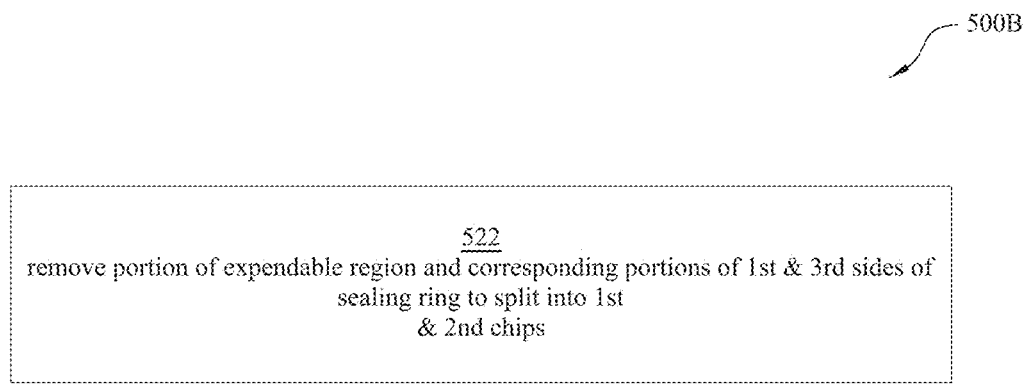

FIG. 5B is a flowchart of a method 500B of manufacturing a semiconductor device, in accordance with some embodiments.

In some embodiments, method 500B is an extension of method 500A of FIG. 5A.

In FIG. 5B, method 500B includes block 522. At block 522, portions of the expendable region and corresponding portions of the first and third sides of the sealing ring are removed to thereby split the double-chip semiconductor device into first and second single-chip semiconductor devices. Examples of the expendable region and corresponding portions of the first and third sides of the sealing ring being removed to thereby split the double-chip semiconductor device into first and second single-chip semiconductor devices are portions of expendable region 209 and corresponding distal 256(D) and proximal 256(P) sides of sealing ring 254 being removed to thereby split double-chip semiconductor device 202A of FIG. 2A. An example of the resultant first single-chip semiconductor device is single-chip semiconductor device 202B of FIG. 2B.

Figure 5C:
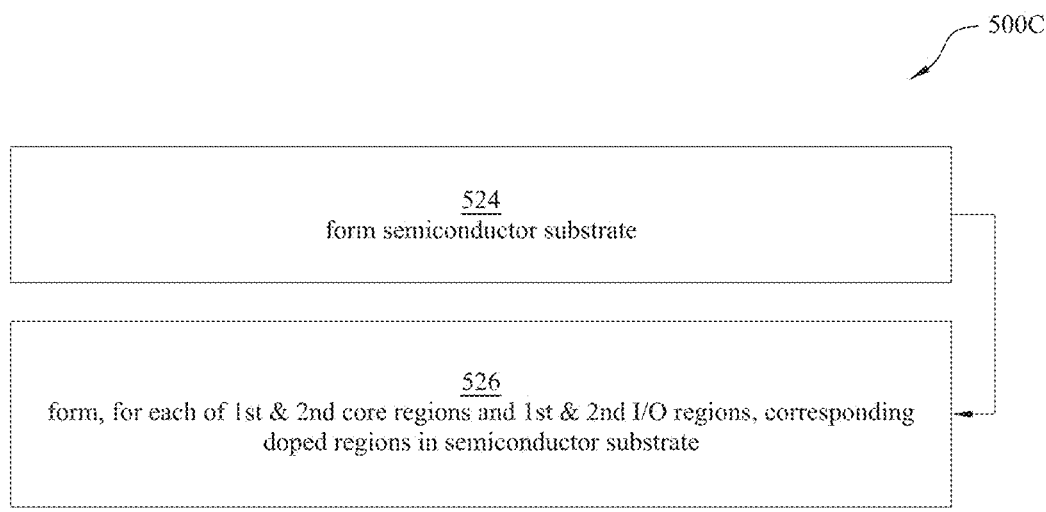

FIG. 5C is a flowchart of a method 500C of manufacturing a semiconductor device, in accordance with some embodiments.

In some embodiments, method 500C is an extension of method 500A of FIG. 5A.

In FIG. 5C, method 500C includes blocks 524-526. At block 524, a semiconductor substrate is formed. An example of semiconductor substrate is substrate 204. From block 524, flow proceeds to block 526.

At block 526, for each of the first and second core regions and in each of the first and second I/O regions, corresponding doped regions are formed in the semiconductor substrate. Examples of corresponding doped regions being formed in the substrate for each of the first and second core regions and in each of the first and second I/O regions are doped regions 210.

FIG. 5D is a flowchart of a method 500D of manufacturing a semiconductor device, in accordance with some embodiments.

In some embodiments, method 500D is an extension of method 500A of FIG. 5A. Method 500D includes block 502', which is a version of block 502 of FIG. 5A. In FIG. 5D, at block 502', structures are formed incrementally using corresponding photolithographic fabrication processes (see FIG. 8). More particularly, at block 502', structures are formed which include the structures formed by block 502 of FIG. 5A, and which further include: first & second stacks correspondingly in the first & second core regions, third & fourth stacks correspondingly in first and second I/O regions, and first and second intra-communication (intra-com) stacks.

Each of the first to fourth stacks includes corresponding segments in one or more of the metallization layers and corresponding via structures in one or more of the interconnection layers. Examples of the first and second intra-com stacks are intra-com stack 236(1) which has intra-com segments 238(1), and intra-com stack 236(2) which has intra-com segments 238(2).

In FIG. 5D, block 502' includes blocks 528, 530, 534, 536, 538 and 540. During formation of the noted structures by block 502', spatial relationships between the noted structures are also established. Blocks 528, 530, 534, 536, 538 and 540, which (again) are included in block 502', represent how the spatial relationships are established. For purposes of discussion, the blocks in block 502' are discussed in the sequence 528, 530, 534, 536, 538 and 540. However, in some embodiments, other sequences of blocks 528, 530, 534, 536, 538 and 540 are contemplated. Hence, the sequence 528, 530, 534, 536, 538 and 540 is not intended to be limiting. In some embodiments, block 502 is accomplished with one or more blocks (not described) in addition to blocks 528, 530, 534, 536, 538 and 540.

At block 528, the first to fourth sides of the sealing ring are isolated from the first and second core regions and the first and second I/O regions. Examples of the first to fourth sides of the sealing ring being isolated from the first and second core regions and the first and second I/O regions include left 256(L), right 256(R), distal 256(D) and proximal 256(P) sides of sealing ring 254 which surround core regions 206(1) and 206(2), I/O regions 208(1) and 208(2). From block 528, flow proceeds to block 530.

At block 530, the sealing ring is arranged as a stack which includes conductive segments in each of the metallization layers and via structures in each of the interconnection layers. An example of the sealing ring being arranged as a stack which includes conductive segments in each of the metallization layers and via structures in each of the interconnection layers is scaling ring 254. More particularly, each of inner wall 258 and expendable outer wall 260 of scaling ring 254 includes: a segment 212 in layer M1; one or more via bars 213 and one or more discrete vias 214 in layer VIA1; a segment 215 in layer M2; one or more via bars 216 and one or more discrete vias 217 in layer VIA2; a segment 218 in layer M3; one or more via bars 219 and one or more discrete vias 220 in VIA3; a segment 221 in layer M4; one or more via bars 222 and one or more discrete vias 223 in VIA4; a segment 224 in layer M5; one or more via bars 225 and one or more discrete vias 226 in VIA5; a segment 227 in layer M6; one or more via bars 228 and one or more discrete vias 229 in VIA6; a segment 230 in layer M7; one or more via bars 231 and one or more discrete vias 232 in VIA7; and a segment 233 in layer M8. From block 530, flow proceeds to block 534.

At block 534, the first intra-com segments are arranged to extend between, and thereby couple, corresponding portions of the first core region and the first I/O region. Examples of the first intra-com segments being arranged to extend between, and thereby couple, corresponding portions of the first core region and the first I/O region are intra-com segments 238(1). Intra-com segments 238(1) extend between, and thereby couple, corresponding portions of core region 206(1) and the I/O region 208(1). From block 534, flow proceeds to block 536.

At block 536, the second intra-com segments are arranged to extend between, and thereby couple, corresponding portions of the second core region and the second I/O region. Examples of the second intra-com segments being arranged to extend between, and thereby couple, corresponding portions of the second core region and the second I/O region are intra-com segments 238(2). Intra-com segments 238(2) extend between, and thereby couple, corresponding portions of core region 206(2) and the I/O region 208(2). From block 536, flow proceeds to block 538.

At block 538, the first parapet is arranged as a stack including conductive segments in each of the M_i+1 to M_k layers and via structures in each of the corresponding interconnection structures. An example of the first parapet being arranged as a stack including conductive segments in each of the M_i+1 to M_k layers and via structures in each of the corresponding interconnection structures is parapet 252(1). More particularly, parapet 252(1) includes: a segment 221 in layer M4; one or more via bars 222 and one or more discrete vias 223 in VIA4; a segment 224 in layer M5; one or more via bars 225 and one or more discrete vias 226 in VIA5; a segment 227 in layer M6; one or more via bars 228 and one or more discrete vias 229 in VIA6; a segment 230 in layer M7; one or more via bars 231 and one or more discrete vias 232 in VIA7; and a segment 233 in layer M8. From block 538, flow proceeds to block 540.

At block 540, the second parapet is arranged as a stack including conductive segments in each of the M_i+1 to M_k layers and via structures in each of the corresponding interconnection structures. An example of the second parapet being arranged as a stack including conductive segments in each of the M_i+1 to M_k layers and via structures in each of the corresponding interconnection structures is parapet 252(2). More particularly, parapet 252(2) includes: a segment 221 in layer M4; one or more via bars 222 and one or more discrete vias 223 in VIA4; a segment 224 in layer M5; one or more via bars 225 and one or more discrete vias 226 in VIA5; a segment 227 in layer M6; one or more via bars 228 and one or more discrete vias 229 in VIA6; a segment 230 in layer M7; one or more via bars 231 and one or more discrete vias 232 in VIA7; and a segment 233 in layer M8.

Figure 5E:
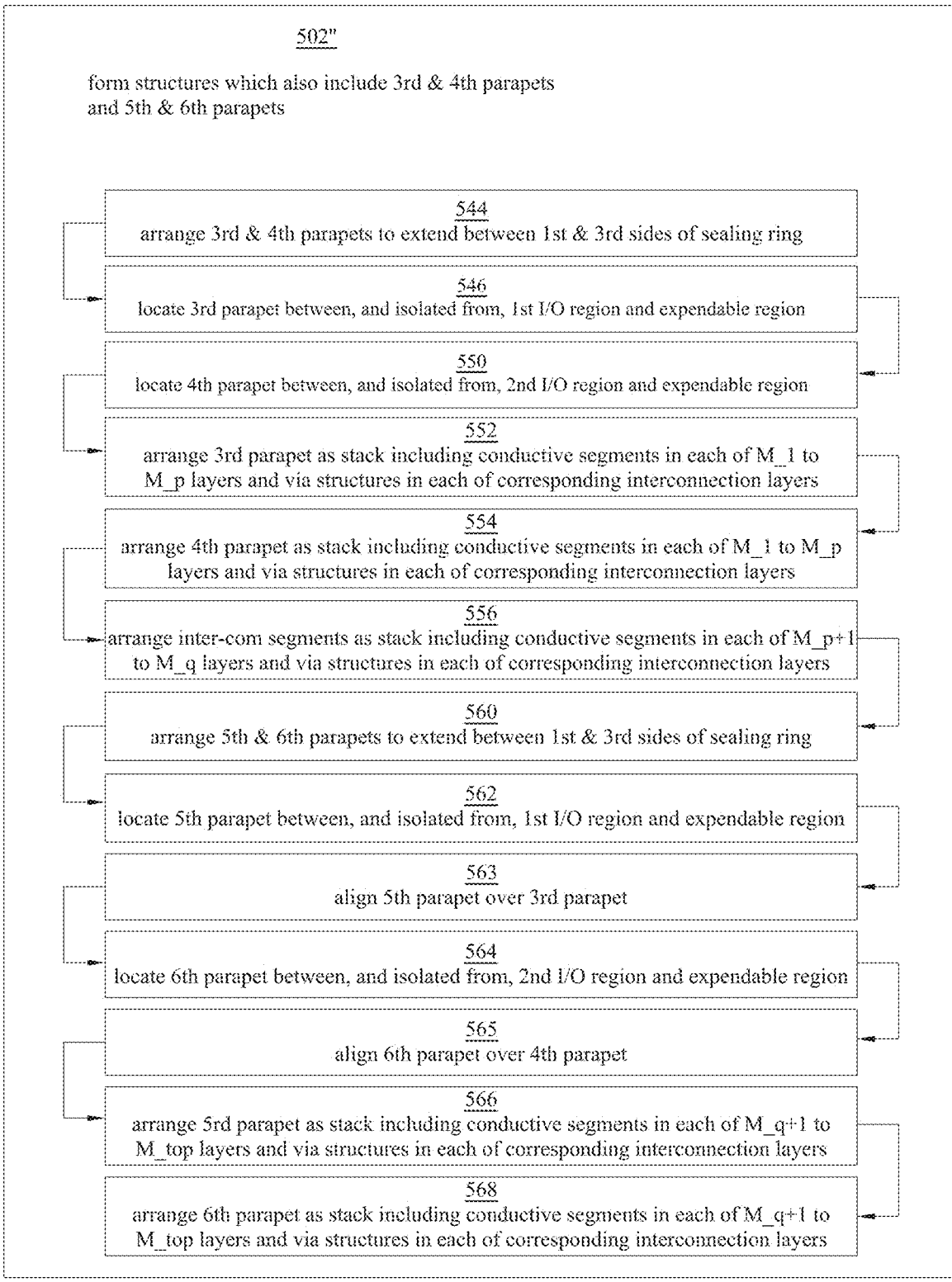

FIG. 5E is a flowchart of a method 500E of manufacturing a semiconductor device, in accordance with some embodiments.

In some embodiments, method 500E is an extension of method 500A of FIG. 5A. Method 500E includes block 502", which is a version of block 502 of FIG. 5A. In FIG. 5E, at block 502", structures are formed incrementally using corresponding photolithographic fabrication processes (see FIG. 8). More particularly, at block 502", structures are formed which include the structures formed by block 502 of FIG. 5A, and which further include: third & fourth parapets, and fifth & sixth parapets. Examples of the third and fourth parapets are corresponding parapets 240(1) and 240(2). Examples of the fifth and sixth parapets are corresponding parapets 262(1) and 262(2).

In FIG. 5E, block 502" includes blocks 544, 546, 550, 552, 554, 556, 560, 562, 563, 564, 656, 566 and 568.

In FIG. 5E, block 502" includes blocks 544, 546, 550, 552, 554, 556, 560, 562, 563, 564, 656, 566 and 568. During formation of the noted structures by block 502", spatial relationships between the noted structures are also established. Blocks 544, 546, 550, 552, 554, 556, 560, 562, 563, 564, 656, 566 and 568, which (again) are included in block 502", represent how the spatial relationships are established. For purposes of discussion, the blocks in block 502' are discussed in the sequence 544, 546, 550, 552, 554, 556, 560, 562, 563, 564, 656, 566 and 568. However, in some embodiments, other sequences of blocks 544, 546, 550, 552, 554, 556, 560, 562, 563, 564, 656, 566 and 568 are contemplated. Hence, the sequence 544, 546, 550, 552, 554, 556, 560, 562, 563, 564, 656, 566 and 568 is not intended to be limiting. In some embodiments, block 502" is accomplished with one or more blocks (not described) in addition to blocks 544, 546, 550, 552, 554, 556, 560, 562, 563, 564, 656, 566 and 568.

At block 544, the third and fourth parapets are arranged to extend between first and third walls of the sealing ring. Examples of the third and fourth parapets being arranged to extend between first and third walls of the sealing ring include corresponding parapets 240(1) and 240(2), each of which extends from distal side 256(D) to proximal side 256(P) of scaling ring 254. From block 544, flow proceeds to block 546.

At block 546, the third parapet is located between, and isolated from, the first core region and the first I/O region. An example of the third parapet being located between, and isolated from, the first core region and the first I/O region is parapet 240(1). Parapet 240(1) is between, and isolated from, core region 206(1) and I/O region 208(1). From block 546, flow proceeds to block 550.

At block 550, the fourth parapet is located between, and isolated from, the second core region and the second I/O region. An example of the fourth parapet being located between, and isolated from, the second core region and the second I/O region is parapet 240(2). Parapet 240(2) is between, and isolated from, core region 206(2) and I/O region 208(2). From block 550, flow proceeds to block 552.

At block 552, the third parapet is arranged as a stack including conductive segments in each of the M_1st to M_p layers and via structures in each of the corresponding interconnection structures. An example of the third parapet being arranged as a stack including conductive segments in each of the M_1st to M_p layers and via structures in each of the corresponding interconnection structures is parapet 240(1). More particularly, parapet 240(1) includes: segments in each of layers M1 to M4; and at least one via bar and at least one discrete via in each of layers VIA1-VIA3. Yet more particularly, parapet 240(1) includes: a segment 212 in layer M1; one or more via bars 213 and one or more discrete vias 214 in layer VIA1; a segment 215 in layer M2; one or more via bars 216 and one or more discrete vias 217 in layer VIA2; a segment 218 in layer M3; one or more via bars 219 and one or more discrete vias 220 in VIA3; a segment 221 in layer M4. From block 552, flow proceeds to block 554.

At block 554, the fourth parapet is arranged as a stack including conductive segments in each of the M_1st to M_p layers and via structures in each of the corresponding interconnection structures. An example of the fourth parapet being arranged as a stack including conductive segments in each of the M_1st to M_p layers and via structures in each of the corresponding interconnection structures is parapet 240(2). More particularly, parapet 240(2) includes: segments in each of layers M1 to M4; and at least one via bar and at least one discrete via in each of layers VIA1-VIA3. Yet more particularly, parapet 240(2) includes: a segment 212 in layer M1; one or more via bars 213 and one or more discrete vias 214 in layer VIA1; a segment 215 in layer M2; one or more via bars 216 and one or more discrete vias 217 in layer VIA2; a segment 218 in layer M3; one or more via bars 219 and one or more discrete vias 220 in VIA3; a segment 221 in layer M4. From block 554, flow proceeds to block 556.

At block 556, the intercom segments are arranged as a stack which includes conductive segments in each of the M_p+1 to M_q layers and via structures in each of the corresponding interconnection layers. Examples of the inter-com segments being arranged as a stack which includes conductive segments in each of the M_p+1 to M_q layers and via structures in each of the corresponding interconnection layers are inter-com segments 248 in inter-com stack 246. From block 556, flow proceeds to block 560.

At block 560, the fifth and sixth parapets are arranged to extend between first and third walls of the sealing ring. Examples of the fifth and sixth parapets being arranged to extend between first and third walls of the sealing ring include corresponding parapets 262(1) and 262(2), each of which extends from distal side 256(D) to proximal side 256(P) of scaling ring 254. From block 560, flow proceeds to block 562.

At block 562, the fifth parapet is located between, and isolated from, the first core region and the first I/O region. An example of the fifth parapet being located between, and isolated from, the first core region and the first I/O region is parapet 262(1). Parapet 262(1) is between, and isolated from, core region 206(1) and I/O region 208(1). From block 562, flow proceeds to block 563.

At block 563, the fifth parapet is aligned over the third parapet. An example of the fifth parapet being aligned over the third parapet is parapet 262(1), which is aligned over parapet 240(1). From block 563, flow proceeds to block 564.

At block 564, the sixth parapet is located between, and isolated from, the second core region and the second I/O region. An example of the sixth parapet being located between, and isolated from, the second core region and the second I/O region is parapet 262(2). Parapet 262(2) is between, and isolated from, core region 206(2) and I/O region 208(2). From block 564, flow proceeds to block 565.

At block 565, the sixth parapet is aligned over the fourth parapet. An example of the sixth parapet being aligned over the fourth parapet is parapet 262(2), which is aligned over parapet 240(2). From block 565, flow proceeds to block 566.

At block 566, the fifth parapet is arranged as a stack including conductive segments in each of the M_q+1 to M_top layers and via structures in each of the corresponding interconnection structures. An example of the fifth parapet being arranged as a stack including conductive segments in each of the M_q+1 to M_top layers and via structures in each of the corresponding interconnection structures is parapet 262(1). More particularly, parapet 262(1) includes: a segment 230 in layer M7; one or more via bars 231 and one or more discrete vias 232 in VIA7; and a segment 233 in layer M8. From block 566, flow proceeds to block 568.

At block 568, the sixth parapet is arranged as a stack including conductive segments in each of the M_q+1 to M_top layers and via structures in each of the corresponding interconnection structures. An example of the sixth parapet being arranged as a stack including conductive segments in each of the M_q+1 to M_top layers and via structures in each of the corresponding interconnection structures is parapet 262(2). More particularly, parapet 262(2) includes: a segment 230 in layer M7; one or more via bars 231 and one or more discrete vias 232 in VIA7; and a segment 233 in layer M8.

FIG. 5F is a flowchart of a method 500F of manufacturing a semiconductor device, in accordance with some embodiments.

In some embodiments, method 500F is an extension of method 500A of FIG. 5A. Method 500F includes block 502", which is a version of block 502 of FIG. 5A. In FIG. 5F, at block 502", structures are formed incrementally using corresponding photolithographic fabrication processes (see FIG. 8). More particularly, at block 502", structures are formed which include the structures formed by block 502 of FIG. 5A, and which further include: first and second wall pads. Examples of the first and second wall pads are corresponding wall pads 271(1) and 272(2).

In FIG. 5F, block 502''' includes block 572, 574 and 576. During formation of the noted structures by block 502''', spatial relationships between the noted structures are also established. Blocks 572, 574 and 576, which (again) are included in block 502'''', represent how the spatial relationships are established. For purposes of discussion, the blocks in block 502''' are discussed in the sequence 572, 574 and 576. However, in some embodiments, other sequences of blocks 572, 574 and 576 are contemplated. Hence, the sequence 572, 574 and 576 is not intended to be limiting. In some embodiments, block 502''' is accomplished with one or more blocks (not described) in addition to blocks 572, 574 and 576.

At block 572, the long axis of the first wall pad is substantially aligned parallel to the long axis of the fifth parapet. An example of the long axis of the first wall pad being substantially aligned parallel to the long axis of the fifth parapet is the long axis of wall pad 272(1), which is substantially aligned parallel to the long axis of wall 266(1). From block 572, flow proceeds to block 574.

At block 574, the long axis of the second wall pad is substantially aligned parallel to the long axis of the sixth parapet. An example of the long axis of the second wall pad being substantially aligned parallel to the long axis of the sixth parapet is the long axis of wall pad 272(2), which is substantially aligned parallel to the long axis of wall 266(2). From block 574, flow proceeds to block 576.

At block 576, relative to the long axis of each of the first and second wall pads, a perpendicular cross-section of each of the first and second wall pads is configured to have a Y-shape. Examples of the cross-sections of the first and second wall pads being configured to have a Y-shape are wall pads 272(1) and 272(2), the cross-section of each of which has a Y-shape.

FIG. 5G is flowchart of a method 500G of manufacturing a semiconductor device, in accordance with some embodiments.

In some embodiments, method 500G is an extension of method 500A of FIG. 5A. Method 500G includes block 502"", which is a version of block 502 of FIG. 5A. In FIG. 5F, at block 502"", structures are formed incrementally using corresponding photolithographic fabrication processes (see FIG. 8). More particularly, at block 502"", structures are formed which include the structures formed by block 502 of FIG. 5A, and which further include: a ring pad. An example of the ring pad is ring pad 268.

Block 502"" includes blocks 580-582. During formation of the noted structures by block 502"", spatial relationships between the noted structures are also established. Blocks 580-582, which (again) are included in block 502"", represent how the spatial relationships are established. For purposes of discussion, the blocks in block 502"" are discussed in the sequence 580-582. However, in some embodiments, a sequence of block 582 then block 580 is contemplated. Hence, the sequence 580-582 is not intended to be limiting. In some embodiments, block 502"" is accomplished with one or more blocks (not described) in addition to blocks 580-582.

At block 580, the ring pad is arranged to have first, second, third and fourth portions which correspond to the first, second, third and fourth sides of the sealing ring. An example of the ring pad being configured as such is ring pad 268, which has sides 270(L), 270(R), 270(D) and 270(P) that correspond to sides 256(L), 256(R), 256(D) and 256(P) of scaling ring 254. From block 580, flow proceeds to block 582.

At block 582, relative to long axes of the first to fourth portions of the ring pad, a perpendicular cross-section of each of the first to fourth portions of the ring pad is configured to have a Y-shape. Examples of the cross-sections of the first to fourth portions of the ring pad being configured to have a Y-shape are the cross-sections of sides 270(L), 270(R), 270(D) and 270(P) of ring pad 268, each of which has a Y-shape.

Figure 6:
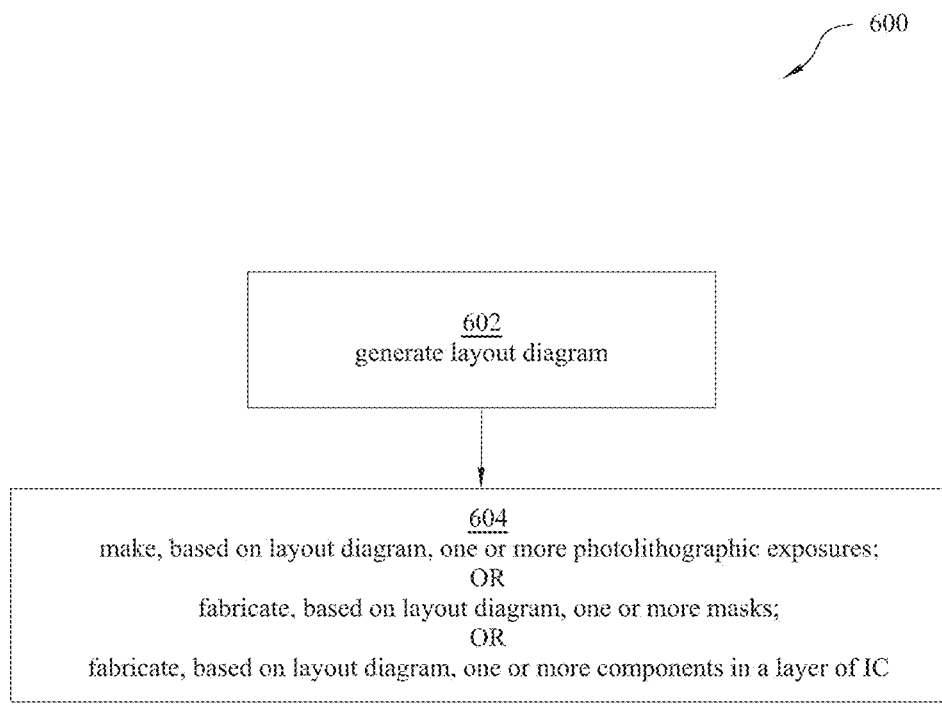
FIG. 6 is a flowchart of a method of manufacturing a semiconductor device, in accordance with some embodiments.

FIG. 6 is a flowchart of a method 600 of manufacturing a semiconductor device, the method including generating a layout diagram, in accordance with some embodiments.

Method 600 is implementable, for example, using EDA system 700 (FIG. 7, discussed below) and an integrated circuit (IC), manufacturing system 800 (FIG. 8, discussed below), in accordance with some embodiments.

In FIG. 6A, method 600 includes blocks 602-604. At block 602, a layout diagram is generated, in accordance with one or more embodiments disclosed herein. An example of an IC package which includes a semiconductor device corresponding to a layout generated by method 600 includes IC package 100 of FIG. 1. Block 602 is implementable, for example, using EDA system 700 (FIG. 7, discussed below), in accordance with some embodiments. Regarding block 602, examples of the layout diagrams which are generated according to block 602 include layout diagrams corresponding to the semiconductor devices disclosed herein, layout diagrams corresponding to the methods disclosed herein, or the like.

At block 604, based on the layout diagram, at least one of (A) one or more photolithographic exposures are made or (B) one or more semiconductor masks are fabricated or (C) one or more components in a layer of a semiconductor device are fabricated. See discussion below of FIG. 8.

Figure 7:
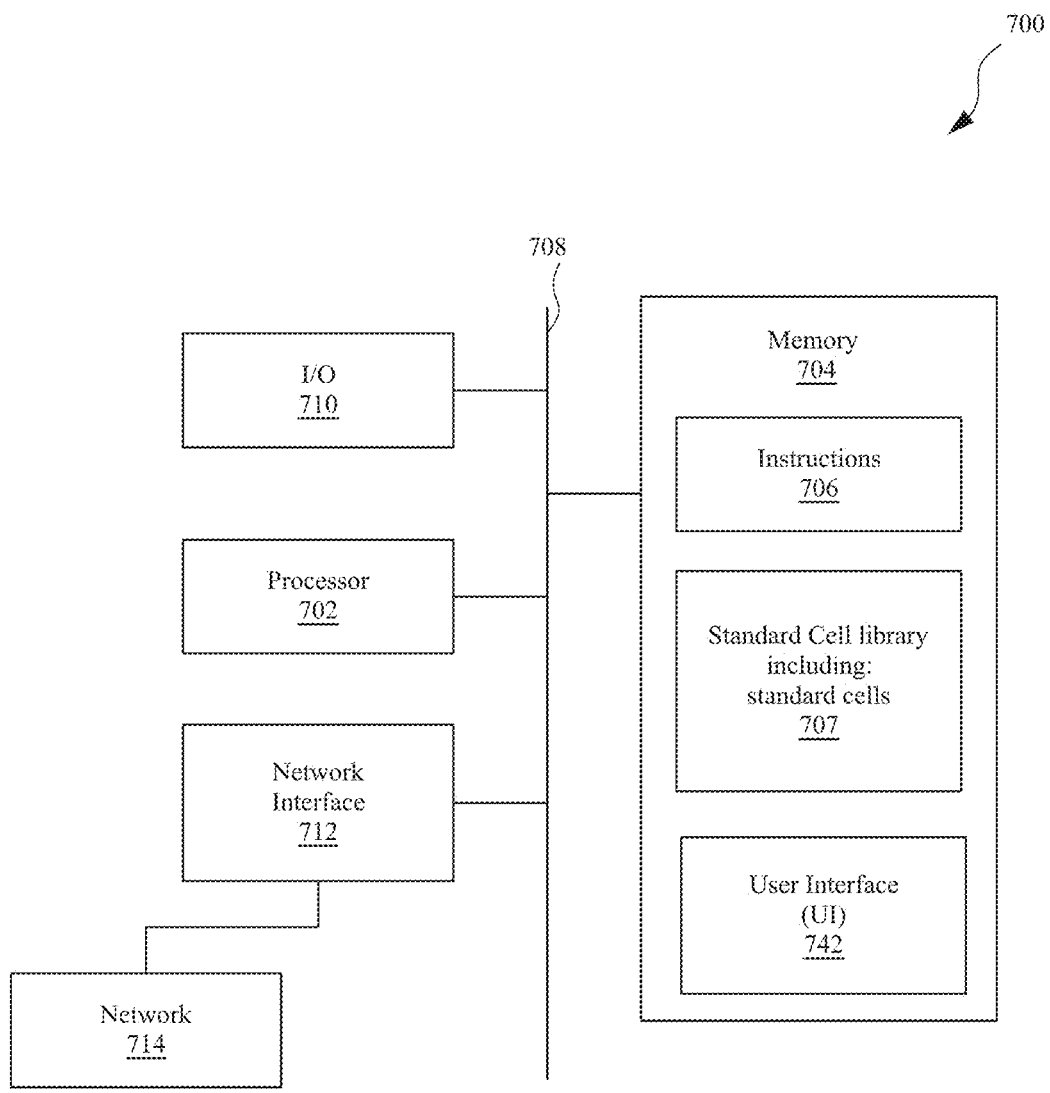
FIG. 7 is a block diagram of an electronic design automation (EDA) system in accordance with some embodiments.

FIG. 7 is a block diagram of an electronic design automation (EDA) EDA system 700 in accordance with some embodiments.

In some embodiments, EDA system 700 includes an APR system. Methods described herein of designing layout diagrams which represent semiconductor devices disclosed herein (the latter also in accordance with one or more embodiments), are implementable, for example, using EDA system 700, in accordance with some embodiments.

In some embodiments, EDA system 700 is a general purpose computing device including a hardware processor 702 and a non-transitory, computer-readable storage medium 704. Storage medium 704, amongst other things, is encoded with, i.e., stores, computer program code 706, i.e., is a set of computer-executable instructions. Execution of instructions 706 by hardware processor 702 represents (at least in part) an EDA tool which implements a portion or all of the methods described herein in accordance with one or more embodiments (hereinafter, the noted processes and/or methods).

Processor 702 is electrically coupled to computer-readable storage medium 704 via a bus 708. Processor 702 is also electrically coupled to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause EDA system 700 (where such execution represents (at least in part) the EDA tool) to be usable for performing a portion or all of the noted processes and/or methods. In one or more embodiments, storage medium 704 also stores information which facilitates performing a portion or all of the noted processes and/or methods. In one or more embodiments, storage medium 704 stores library 707 of standard cells including such standard cells as disclosed herein.

EDA system 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 coupled to processor 702. Network interface 712 allows EDA system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 700.

EDA system 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
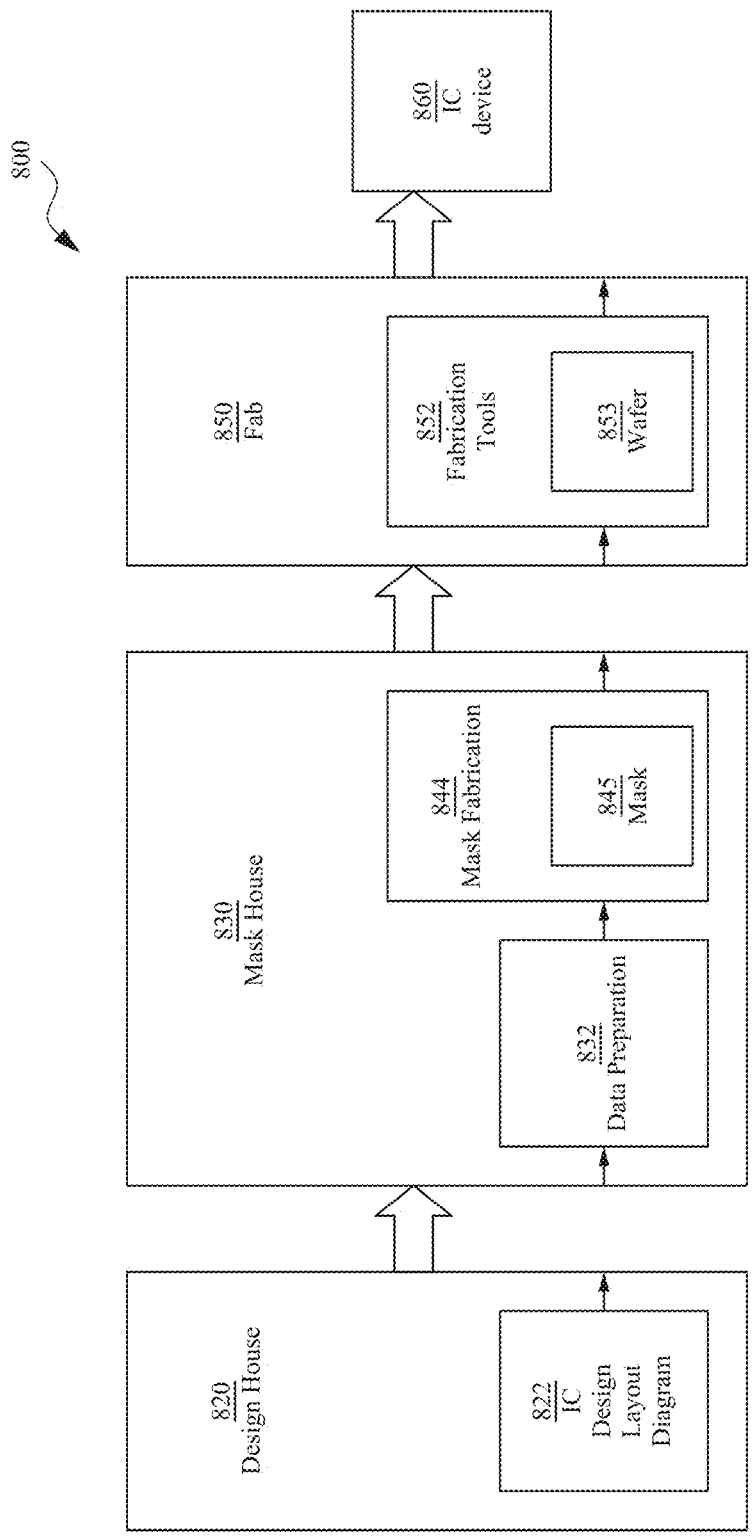
FIG. 8 is a block diagram of a semiconductor device manufacturing system, and an IC manufacturing flow associated therewith, in accordance with some embodiments.

FIG. 8 is a block diagram of an integrated circuit (IC, manufacturing system 800, and an IC manufacturing flow associated therewith, in accordance with some embodiments.

In some embodiments, based on a layout diagram, e.g., at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns designed for an IC device 860. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or discrete vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file (RDF). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for photolithographic implementation effects during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus (DOF), mask error enhancement factor (MEEF), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 is an IC fabrication business that includes one or more manufacturing facilities for the fabrication of a variety of different IC products. In some embodiments, IC fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 includes fabrication tools 852 configured to execute various manufacturing operations on semiconductor wafer 853 such that IC device 860 is fabricated in accordance with the mask(s), e.g., mask 845. In various embodiments, fabrication tools 852 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-level interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

Figure 9A:
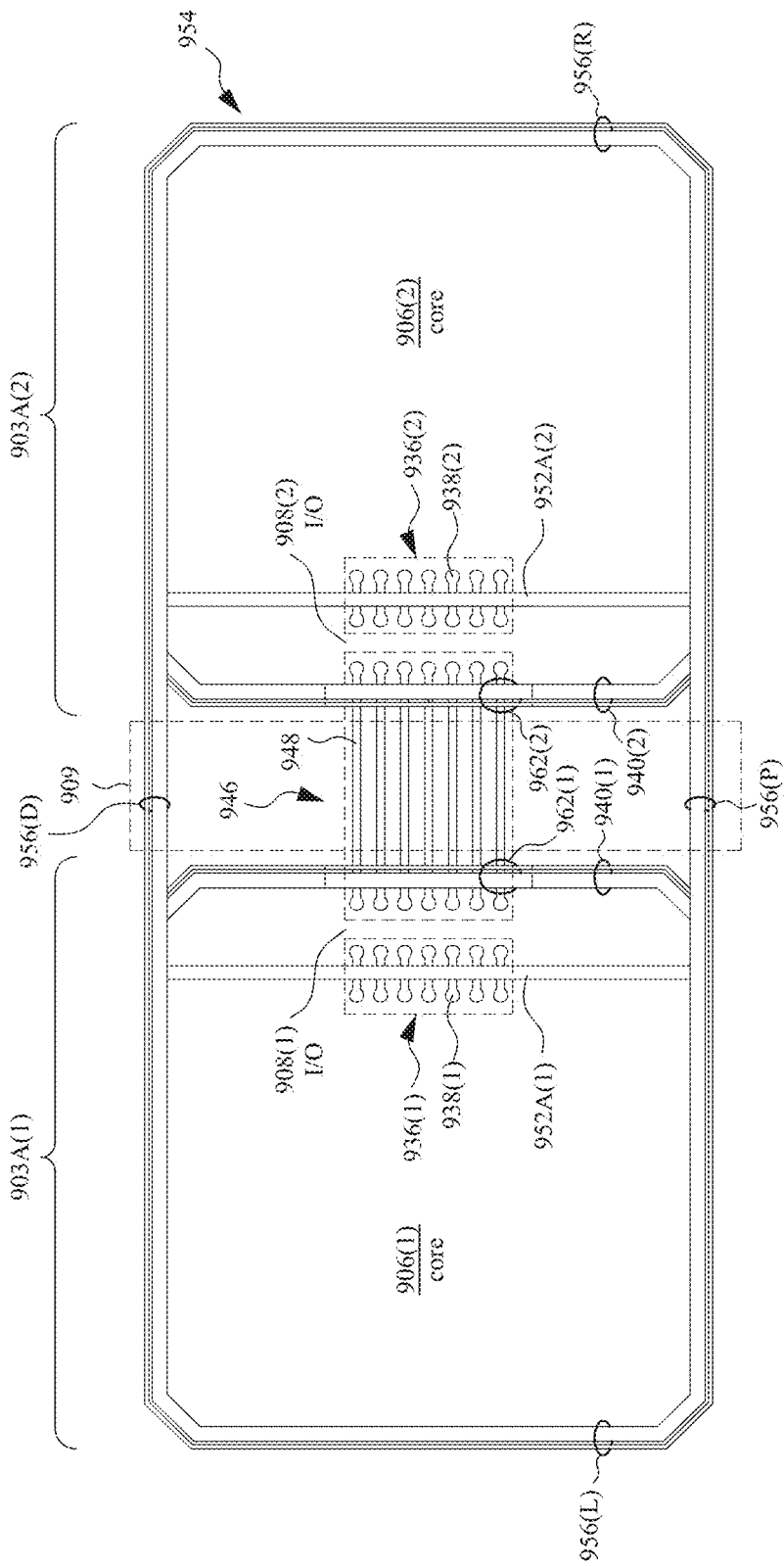
FIGS. 9A-9B are corresponding top views (plan views) of corresponding layers of a semiconductor device, in accordance with some embodiments.
Figure 9B:
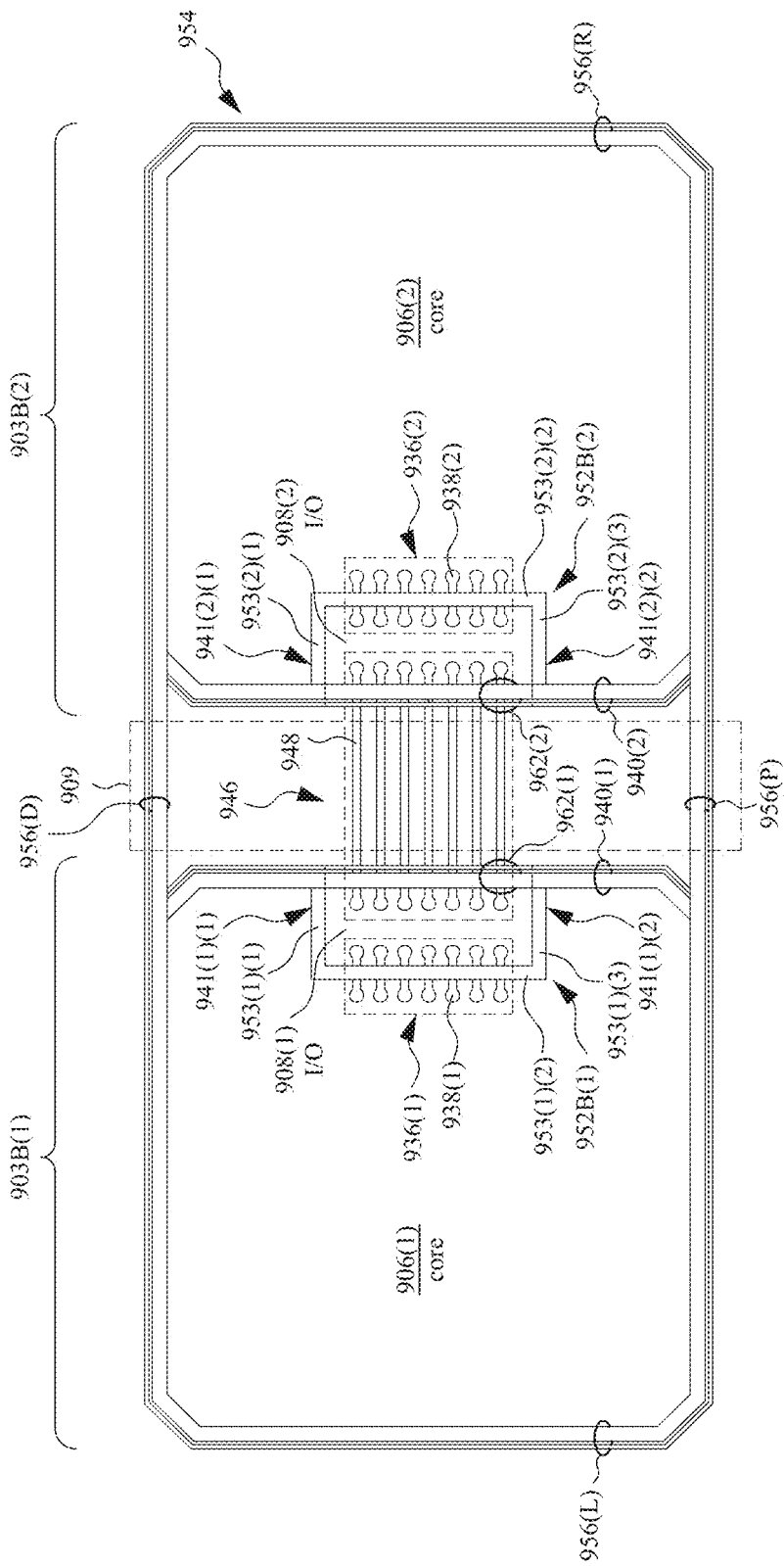

FIGS. 9A-9B are corresponding top views (plan views) of corresponding layers of a semiconductor device, in accordance with some embodiments.

FIGS. 9A-9B follow a similar numbering scheme to that of FIGS. 3A-3F, the latter using 2-series numbers as noted above. Though corresponding, some components also differ. To help identify components which correspond but nevertheless have differences, the numbering convention uses 9-series numbers for FIGS. 9A-9B while the numbering convention for FIGS. 3A-3F uses 2-series numbers. For example, item 908(1) of FIG. 9A is an I/O region and corresponding item 208(1) in FIG. 3A is an I/O region. For brevity, the discussion will focus more on differences between FIGS. 9A-9B and FIGS. 3A-3F than on similarities.

In effect, FIG. 9A is a summary of FIGS. 3A-3B. As such, FIG. 9A facilitates observing differences with respect to FIG. 9B, as discussed below.

The semiconductor device of FIG. 9A includes chips 903A(1) and 903A(2); a sealing ring 954 which has sides 956(L), 956(R), 956(D) and 956(P); an expendable region 909 therebetween; and an inter-com stack 946 which has inter-segments 948. Chip 903A(1) includes; core region 906(1); I/O region 908(1); intra-com stack 936(1) which has intra-com segments 938(1); parapet 940(1); parapet 952A(1); and parapet 962(1). Chip 903A(2) includes: core region 906(2); I/O region 908(2); intra-com stack 936(2) which has intra-com segments 938(2); parapet 940(2); parapet 952A(2); and parapet 962(2).

In FIG. 9A, each of parapets 940(1) and 940(2) extends from side 956(D) to side 956(P) of sealing ring 954. Similarly, each of parapets 952A(1) and 952A(2) extends from side 956(D) to side 956(P) of sealing ring 954. Each of parapets 952A(1) and 952A(2) is substantially a straight line. As such, each of parapets 952A(1) and 952A(2) has one segment.

In FIG. 9B, parapet 952B(1) extends from a first location 941(1)(1) on parapet 940(1) to a second location 941(1)(2) on parapet 940(1). Parapet 952B(1) is a piecewise-continuous line which includes segments 953(1)(1), 953(1)(2) and 953(1)(3).

Segments 953(1)(1) and 953(1)(3) are substantially parallel to corresponding sides 956(D) and 956(P) of scaling ring 954. Segment 953(1)(2) is substantially parallel to side 956(L) of sealing ring 954. Segment 953(1)(1) intersects parapet 940(1) at first location 941(1)(1). Segment 953(1)(3) intersects parapet 940(1) at second location 941(1)(2). Segment 953(1)(1) extends between segments 953(1)(1) and 953(1)(2).

In FIG. 9B, parapet 952B(2) extends from a first location 941(2)(1) on parapet 940(2) to a second location 941(2)(2) on parapet 940(2). Parapet 952B(2) is a piecewise-continuous line which includes segments 953(2)(1), 953(2)(2) and 953(2)(3).

Segments 953(2)(1) and 953(2)(3) are substantially parallel to corresponding sides 956(D) and 956(P) of scaling ring 954. Segment 953(2)(2) is substantially parallel to side 956(R) of sealing ring 954. Segment 953(2)(1) intersects parapet 940(2) at first location 941(2)(1). Segment 953(2)(3) intersects parapet 940(2) at second location 941(2)(2). Segment 953(2)(1) extends between segments 953(2)(1) and 953(2)(2).

In each of FIGS. 9A and 9B, a quantity of intra-com segments 938(1) is represented by a variable A, a quantity of inter-com segments 948 is represented by a variable C, and a quantity of intra-com segments 938(1) is represented by a variable B. In each of FIGS. 9A and 9B, A=C and B=C, i.e., A=C=B.

In some embodiments (not shown), A>C and B>C and A=B. In some embodiments (not shown), A>C and B>C and A>B. In some embodiments (not shown), A>C and B>C and A<B.

In some embodiments (not shown), A<C and B<C and A=B. In some embodiments (not shown), A<C and B<C and A>B. In some embodiments (not shown), A<C and B<C and A<B.

In some embodiments (not shown), A>C, B<C and A>B. In some embodiments (not shown), A<C, B>C and A<B.

Figure 10A:
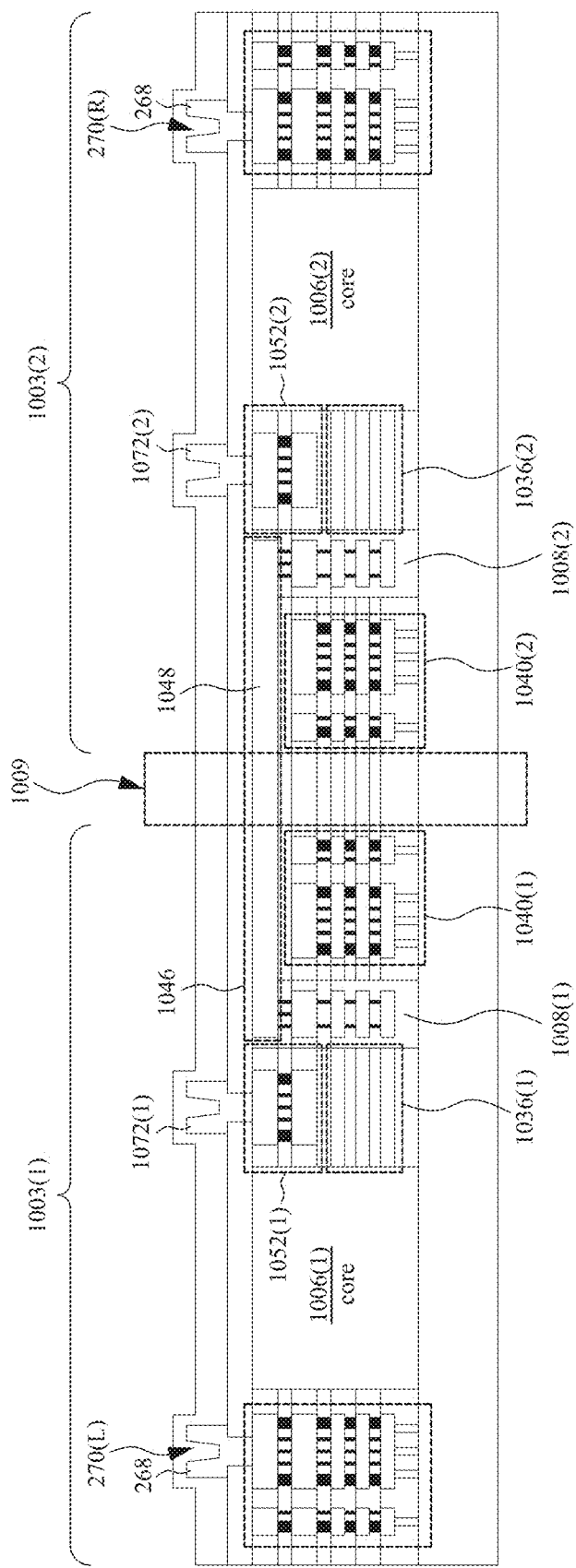
FIGS. 10A-10B are correspondingly a sectional view and a three-quarter perspective view of a semiconductor device, in accordance with some embodiments.
Figure 10B:
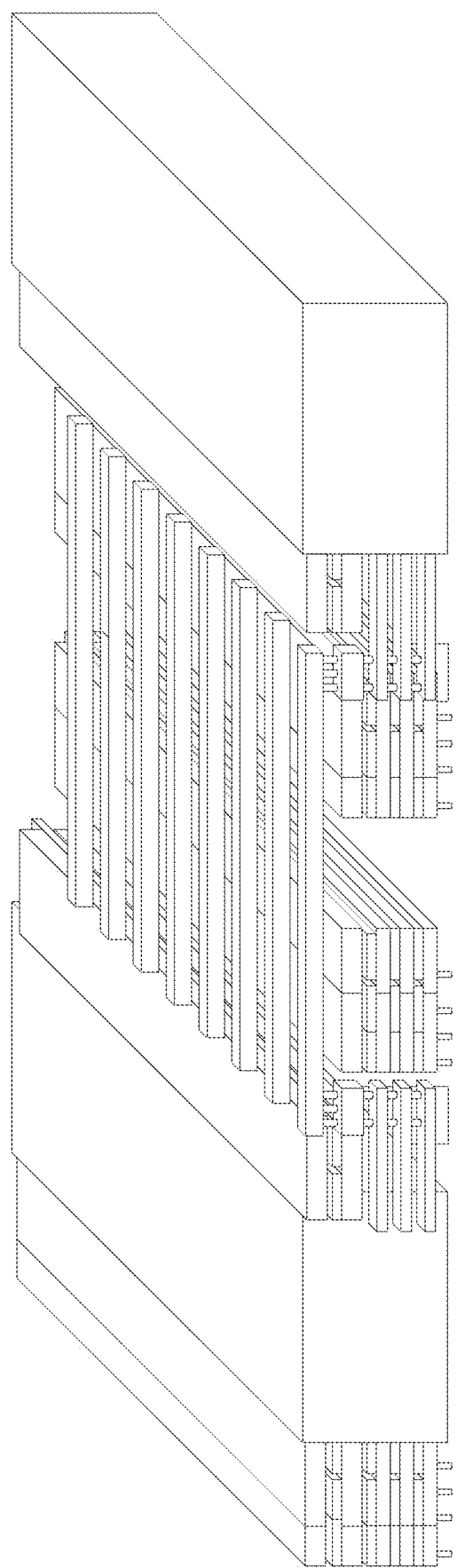

FIGS. 10A-10B are correspondingly a sectional view and a three-quarter perspective view of a semiconductor device, in accordance with some embodiments.

FIGS. 10A-10B follow a similar numbering scheme to that of FIGS. 2A-2A'. Though corresponding, some components also differ. To help identify components which correspond but nevertheless have differences, the numbering convention uses 10-series numbers for FIGS. 10A-10B while the numbering convention for FIGS. 2A-2A' uses 2-series numbers. For example, item 1072(1) of FIG. 10A is a wall pad and corresponding item 272(1) in FIG. 2A is a wall pad. For brevity, the discussion will focus more on differences between FIGS. 10A-10B and FIGS. 2A-2A' than on similarities.

In particular, details of the sectional view of FIG. 10A will be discussed with the understanding that FIG. 10B shows substantially the same details albeit as a three-quarter perspective view. It is noted that FIG. 10B is a simplification of FIG. 10A in that not all of the elements of FIG. 10A are shown in FIG. 10B.

The semiconductor device of FIG. 10A includes chips 1003(1) and 1003(2); an expendable region 1009 therebetween; and an inter-com stack 1046 which has one or more inter-segments 1048. Chip 1003(1) includes; core region 1006(1); I/O region 1008(1); intra-com stack 1036(1); parapet 1040(1); parapet 1052(1); and wall pad 1072(1). Chip 1003(2) includes: core region 1006(2); I/O region 1008(2); intra-com stack 1036(2); parapet 1040(2); parapet 1052(2)); and wall pad 1072(2).

In FIG. 10A, wall pads 1072(1) and 1072(2) correspond to wall pads 272(1) and 272(2) of FIGS. 2A and 2A'. Whereas wall pads 272(1) and 272(2) are over corresponding parapets 240(1) and 240(2), wall pads 1072(1) and 1072(2) are cover corresponding parapets 1052(1) and 1052(2).

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein.

In some embodiments, a semiconductor device includes: a core region of core circuitry over a substrate; an input/output (I/O) region of interfacing circuitry over a substrate and coupled to the core region; a sealing ring having first, second and third sides, the sealing ring surrounding, and being isolated from, the core region and the I/O region; an intra-communication (intra-com) stack including intra-com segments in corresponding metallization layers which are stacked, the intra-com segments correspondingly extending between, and thereby coupling, the core region and the I/O region; and a first parapet on the intra-com stack and which extends from the first side to the third side of the sealing ring the first parapet being between, and isolated from each of, the core region and the I/O region.

In some embodiments, the semiconductor device further includes: a semiconductor substrate extending in the first direction and in a second direction, the first and second directions being perpendicular; and each of the core region and the I/O region includes corresponding doped regions formed in the semiconductor substrate.

In some embodiments, each of the metallization layers extends in the first direction and a second direction, the first and second directions being perpendicular; and each of the core region and the I/O region has: a corresponding footprint representing an area relative to the first and second directions; and a height extending in a third direction which is perpendicular to each of the first and second directions; the core region and the I/O region include: corresponding first, second, third, fourth and fifth stacks, each of the first to fifth stacks extending in the third direction, each of the first to fifth stacks including corresponding conductive segments in one or more of the metallization layers; and the first to fourth sides of the sealing ring being isolated correspondingly from the core region and the I/O region; and the sealing ring is arranged as a stack which includes conductive segments in each of the metallization layers.

In some embodiments, relative to the third direction, the metallization layers include: a first layer of metallization (M_1st layer) which, among the metallization layers, is most proximal to a semiconductor substrate; a top layer of metallization (M_top layer) which, among the metallization layers, is most distal to the semiconductor substrate relative to the third direction; and an $(i)^{th}$ layer of metallization (M_i layer) which is between the M_1st layer and the M_top layer; and the intra-com stack includes first intra-com segments in each of the M_1st to M_i layers, each of the intra-com segments correspondingly extending between, and thereby coupling, the core region and the I/O region.

In some embodiments, relative to the third direction, the metallization layers further include: an $(i+1)^{th}$ layer of metallization (M_i+1 layer) which is between the M_i layer and the M_top layer, and with none of the metallization layers being between the M_i and M_i+1 layers; a $(k)^{th}$ layer of metallization (M_k layer) which is between the M_i layer and the M_top layer; and the first parapet is arranged as a stack including: conductive segments in each of the M_i+1 to M_k layers; and via structures in each of the corresponding interconnection layers.

In some embodiments, the semiconductor device further includes a third parapet; the third parapet being between, and isolated from, the I/O region; and wherein: each of the metallization layers extends in first and second directions, the first and second directions being perpendicular; relative to the third direction which is perpendicular to each of the first and second directions, the metallization layers include: a first layer of metallization (M_1st layer) which, among the metallization layers, is most proximal a semiconductor substrate; a top layer of metallization (M_top layer) which, among the metallization layers, is most distal to the semiconductor substrate relative to the third direction; a (p)th layer of metallization (M_p layer) which is between the M_1st layer and the M_top layer; a (p+1)th layer of metallization (M_p+1 layer) which is between the M_p layer and the M_top layer, and with none of the metallization layers being between the M_p and M_p+1 layers; and a (q)th layer of metallization (M_q layer) which is between the M_p+1 layer and the M_top layer; the third parapet is arranged as a stack including: conductive segments in each of the M_1st to M_p layers; and via structures in each of the corresponding interconnection layers; the semiconductor device further includes: a fifth parapet which extends from the first side to the third side of the sealing ring; the fifth parapet being between, and isolated from, the I/O region, and being aligned over the third parapet; and relative to the third direction, the metallization layers further include: a (q+1)th layer of metallization (M_q+1 layer) which is between the M_q layer and the M_top layer, and with none of the metallization layers being between the M_q and M_q+1 layers; and the fifth parapet is arranged as a stack including: conductive segments in each of the M_q+1 to M_top layers; and via structures in each of the corresponding interconnection layers; the semiconductor device further includes: a wall pad on the third parapet; and a long axis of the wall pad is substantially aligned with a long axis of the third parapet; and relative to the long axis of the wall pad, a perpendicular cross-section of wall pad has a Y-shape.

In some embodiments, material forming the wall pad includes Aluminum.

In some embodiments, the semiconductor device further includes a ring pad on the sealing ring, the ring pad having first, second, third and fourth portions corresponding to the first, second, third and fourth sides of the sealing ring; and wherein, relative correspondingly to a long axis of each of the first to fourth portions of the ring pad, a perpendicular cross-section of each of the first to fourth portions of the ring pad has a Y-shape.

In some embodiments, a semiconductor device includes: a subject region including circuitry to be protected; a sealing ring having first, second and third sides, the scaling ring surrounding, and being isolated from, the subject region; and a first parapet over a substrate and which extends from the first side to the third side of the sealing ring the subject region being between the second side and the first parapet, and the first parapet being isolated from the subject region; and an inter-communication (inter-com) stack on the first parapet and including inter-com segments in corresponding stacked metallization layers, the inter-com segments correspondingly coupling to the subject region and extending therefrom in a direction away from the second side.

In some embodiments, the semiconductor device further includes: metallization layers; and interconnection layers which are interleaved between the metallization layers; and wherein: each of the metallization layers and each of the interconnection layers extend in the first direction and a second direction, the first and second directions being perpendicular; and the subject region has: a footprint representing an area relative to the first and second directions; and a height extending in a third direction which is perpendicular to each of the first and second directions; the subject region includes: a stack on a semiconductor substrate extending in the third direction, the stacks including corresponding conductive segments in one or more of the metallization layers and via structures in one or more of the interconnection layers; and the first to third sides of the scaling ring being isolated correspondingly from the subject region; and the scaling ring is arranged as a stack which includes: conductive segments in each of the metallization layers and via structures in each of the interconnection layers.

In some embodiments, relative to the third direction, the metallization layers include: a first layer of metallization (M_1st layer) which, among the metallization layers, is most proximal to the semiconductor substrate; a top layer of metallization (M_top layer) which, among the metallization layers, is most distal to the semiconductor substrate relative to the third direction; and an (i)th layer of metallization (M_i layer) which is between the M_1st layer and the M_top layer; and the semiconductor device further includes an intra-communication (intra-com) stack including intra-com segments in each of the M_1st to M_i layers, each of the intra-com segments correspondingly extending between, and thereby coupling, different portion of the subject region.

In some embodiments, relative to the third direction, the metallization layers further include: an (i+1)th layer of metallization (M_i+1 layer) which is between the M_i layer and the M_top layer, and with none of the metallization layers being between the M_i and M_i+1 layers; a (k)th layer of metallization (M_k layer) which is between the M_i layer and the M_top layer; the first parapet is arranged as a stack including: conductive segments in each of the M_i+1 to M_k layers; and via structures in each of the corresponding interconnection layers.

In some embodiments, the semiconductor device further includes: a second parapet on the inter-com stack and which extends from the first side to the third side of the sealing ring, the subject region being between the second side and the second parapet, the second parapet being isolated from the subject region.

In some embodiments, the semiconductor device further includes: metallization layers; and interconnection layers which are interleaved between the metallization layers; and wherein: each of the metallization layers and each of the interconnection layers extend in the first direction and a second direction, the first and second directions being perpendicular; and relative to a third direction which is perpendicular to each of the first and second directions, the metallization layers include: a first layer of metallization (M_1st layer) which, among the metallization layers, is most proximal to a semiconductor substrate; a top layer of metallization (M_top layer) which, among the metallization layers, is most distal to the semiconductor substrate relative to the third direction; and a $(p)^{th}$ layer of metallization (M_p layer) which is between the M_1st layer and the M_top layer; and the second parapet is arranged as a stack including: conductive segments in each of the M_1st to M_p layers; and via structures in each of the corresponding interconnection layers; relative to the third direction, the metallization layers further include: a (p+1)th layer of metallization (layer M_p+1) which is between the M_p layer and the M_top layer, and with none of the metallization layers being between the M_p and M_p+1 layers; a (q)th layer of metallization (M_q layer) which is between the M_p+1 layer and the M_top layer; and a (q+1)th layer of metallization (M_q+1 layer) which is between the M_q layer and the M_top layer, and with none of the metallization layers being between the M_q and M_q+1 layers; and the semiconductor device further includes: inter-com segment-remnants in each of the M_p+1 to M_q layers, each of the inter-com segment-remnants being correspondingly coupled to the subject region at a first end and open-circuited at a second end, the second end being proximal to a diced edge of the semiconductor device.

In some embodiments, the semiconductor device further includes: a third parapet on the inter-com stack and which extends from the first side to the third side of the sealing ring, the subject region being between the second side and the third parapet, the second parapet being isolated from the subject region.

In some embodiments, the semiconductor device further includes: a wall pad on the third parapet; and wherein: a long axis of the wall pad is substantially aligned with a long axis of the third parapet; and relative to the long axis of the wall pad, a perpendicular cross-section of the wall pad has a Y-shape.

In some embodiments, a semiconductor device includes: a subject region including circuitry to be protected; a sealing ring having first, second and third sides, the sealing ring surrounding, and being isolated from, the subject region; and a first parapet over a substrate and which extends from the first side to the third side of the sealing ring the subject region being between the second side and the first parapet, and the first parapet being isolated from the subject region; and a second parapet over the first parapet and which extends from the first side to the third side of the sealing ring, the subject region being between the second side and the second parapet, the second parapet being isolated from the subject region.

In some embodiments, the semiconductor device further includes: an intra-communication (intra-com) stack including intra-com segments in corresponding metallization layers which are stacked, the intra-com segments correspondingly extending between, and thereby coupling, the core region and the I/O region; and a third parapet on the intra-com stack and which extends from the first side to the third side of the sealing ring, the subject region being between the second side and the third parapet, different portions of the subject region.

In some embodiments, the semiconductor device further includes: an inter-communication (inter-com) stack on the first parapet, under the second parapet and including inter-com segments in corresponding stacked metallization layers, the inter-com segments correspondingly coupling to and the I/O region; and extending therefrom in a direction away from the second side.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device comprising:
   a core region of core circuitry over a substrate;
   an input/output (I/O) region of interfacing circuitry over a substrate and coupled to the core region;
   a sealing ring having first, second and third sides, the sealing ring surrounding, and being isolated from, the core region and the I/O region;
   an intra-communication (intra-com) stack including intra-com segments in corresponding metallization layers which are stacked, the intra-com segments correspondingly extending between, and thereby coupling, the core region and the I/O region; and
   a first parapet on the intra-com stack and which extends from the first side to the third side of the sealing ring, the first parapet being between, and isolated from each of, the core region and the I/O region.

2. The semiconductor device of claim 1, wherein the semiconductor device further comprises:
   a semiconductor substrate extending in a first direction and in a second direction, the first and second directions being perpendicular; and
   each of the core region and the I/O region includes corresponding doped regions formed in the semiconductor substrate.

3. The semiconductor device of claim 1, wherein:
   each of the metallization layers extends in a first direction and a second direction, the first and second directions being perpendicular; and
   each of the core region and the I/O region has:
      a corresponding footprint representing an area relative to the first and second directions; and
      a height extending in a third direction which is perpendicular to each of the first and second directions;
   the core region and the I/O region include:
      corresponding first, second, third, fourth and fifth stacks, each of the first to fifth stacks extending in the third direction, each of the first to fifth stacks including corresponding conductive segments in one or more of the metallization layers; and
   the first to fourth sides of the sealing ring being isolated correspondingly from the core region and the I/O region; and
   the sealing ring is arranged as a stack which includes:
      conductive segments in each of the metallization layers.

4. The semiconductor device of claim 3, wherein:
   relative to the third direction, the metallization layers include:
      a first layer of metallization (M_1st layer) which, among the metallization layers, is most proximal to a semiconductor substrate;
      a top layer of metallization (M_top layer) which, among the metallization layers, is most distal to the semiconductor substrate relative to the third direction; and
      an $(i)^{th}$ layer of metallization (M_i layer) which is between the M_1st layer and the M_top layer; and
   the intra-com stack includes first intra-com segments in each of the M_1st to M_i layers, each of the intra-com segments correspondingly extending between, and thereby coupling, the core region and the I/O region.

5. The semiconductor device of claim 4, wherein:
   relative to the third direction, the metallization layers further include:
      an $(i+1)^{th}$ layer of metallization (M_i+1 layer) which is between the M_i layer and the M_top layer, and with none of the metallization layers being between the M_i and M_i+1 layers;
      a $(k)^{th}$ layer of metallization (M_k layer) which is between the M_i layer and the M_top layer; and
   the first parapet is arranged as a stack including:
      conductive segments in each of the M_i+1 to M_k layers; and
      via structures in each of the corresponding interconnection layers.

6. The semiconductor device of claim 1, further comprising:
   a third parapet;
   the third parapet being between, and isolated from, the I/O region; and
   wherein:
      each of the metallization layers extends in first and second directions, the first and second directions being perpendicular;
      relative to a third direction which is perpendicular to each of the first and second directions, the metallization layers include:
         a first layer of metallization (M_1st layer) which, among the metallization layers, is most proximal a semiconductor substrate;
         a top layer of metallization (M_top layer) which, among the metallization layers, is most distal to the semiconductor substrate relative to the third direction;
         a $(p)^{th}$ layer of metallization (M_p layer) which is between the M_1st layer and the M_top layer;
         a $(p+1)^{th}$ layer of metallization (M_p+1 layer) which is between the M_p layer and the M_top layer, and with none of the metallization layers being between the M_p and M_p+1 layers; and a (q)$^{th}$ layer of metallization (M_q layer) which is between the M_p+1 layer and the M_top layer;
the third parapet is arranged as a stack including:
conductive segments in each of the M_1st to M_p layers; and
via structures in each of the corresponding interconnection layers;
the semiconductor device further comprises:
a fifth parapet which extends from the first side to the third side of the sealing ring;
the fifth parapet being between, and isolated from, the I/O region, and being aligned over the third parapet; and
relative to the third direction, the metallization layers further include:
a (q+1)$^{th}$ layer of metallization (M_q+1 layer) which is between the M_q layer and the M_top layer, and with none of the metallization layers being between the M_q and M_q+1 layers; and
the fifth parapet is arranged as a stack including:
conductive segments in each of the M_q+1 to M_top layers; and
via structures in each of the corresponding interconnection layers;
the semiconductor device further comprises:
a wall pad on the third parapet; and
a long axis of the wall pad is substantially aligned with a long axis of the third parapet; and
relative to the long axis of the wall pad, a perpendicular cross-section of wall pad has a Y-shape.

7. The semiconductor device of claim 6, wherein:
material forming the wall pad includes Aluminum.

8. The semiconductor device of claim 1, further comprising:
a ring pad on the sealing ring, the ring pad having first, second, third and fourth portions corresponding to the first, second, third and fourth sides of the sealing ring; and
wherein, relative correspondingly to a long axis of each of the first to fourth portions of the ring pad, a perpendicular cross-section of each of the first to fourth portions of the ring pad has a Y-shape.

9. The semiconductor device of claim 8, wherein:
material forming the ring pad includes Aluminum.

10. A semiconductor device comprising:
a subject region including circuitry to be protected;
a sealing ring having first, second and third sides, the sealing ring surrounding, and being isolated from, the subject region; and
a first parapet over a substrate and which extends from the first side to the third side of the sealing ring, the subject region being between the second side and the first parapet, and the first parapet being isolated from the subject region; and
an inter-communication (inter-com) stack on the first parapet and including inter-com segments in corresponding stacked metallization layers, the inter-com segments correspondingly coupling to the subject region and extending therefrom in a direction away from the second side.

11. The semiconductor device of claim 10, wherein the semiconductor device further comprises:
metallization layers; and
interconnection layers which are interleaved between the metallization layers; and
wherein:
each of the metallization layers and each of the interconnection layers extend in a first direction and a second direction, the first and second directions being perpendicular; and
the subject region has:
a footprint representing an area relative to the first and second directions; and
a height extending in a third direction which is perpendicular to each of the first and second directions;
the subject region includes:
a stack on a semiconductor substrate extending in the third direction, the stacks including corresponding conductive segments in one or more of the metallization layers and via structures in one or more of the interconnection layers; and
the first to third sides of the sealing ring being isolated correspondingly from the subject region; and
the sealing ring is arranged as a stack which includes:
conductive segments in each of the metallization layers and via structures in each of the interconnection layers.

12. The semiconductor device of claim 11, wherein:
relative to the third direction, the metallization layers include:
a first layer of metallization (M_1st layer) which, among the metallization layers, is most proximal to the semiconductor substrate;
a top layer of metallization (M_top layer) which, among the metallization layers, is most distal to the semiconductor substrate relative to the third direction; and
an (i)$^{th}$ layer of metallization (M_i layer) which is between the M_1st layer and the M_top layer; and
the semiconductor device further comprises:
an intra-communication (intra-com) stack including intra-com segments in each of the M_1st to M_i layers, each of the intra-com segments correspondingly extending between, and thereby coupling, different portion of the subject region.

13. The semiconductor device of claim 12, wherein:
relative to the third direction, the metallization layers further include:
an (i+1)$^{th}$ layer of metallization (M_i+1 layer) which is between the M_i layer and the M_top layer, and with none of the metallization layers being between the M_i and M_i+1 layers;
a (k)$^{th}$ layer of metallization (M_k layer) which is between the M_i layer and the M_top layer;
the first parapet is arranged as a stack including:
conductive segments in each of the M_i+1 to M_k layers; and
via structures in each of the corresponding interconnection layers.

14. The semiconductor device of claim 10, wherein the semiconductor device further comprises:
a second parapet on the inter-com stack and which extends from the first side to the third side of the sealing ring, the subject region being between the second side and the second parapet, the second parapet being isolated from the subject region.

15. The semiconductor device of claim 14, further comprising:
metallization layers; and
interconnection layers which are interleaved between the metallization layers; and
wherein:

each of the metallization layers and each of the interconnection layers extend in a first direction and a second direction, the first and second directions being perpendicular; and relative to a third direction which is perpendicular to each of the first and second directions, the metallization layers include:
- a first layer of metallization (M_1st layer) which, among the metallization layers, is most proximal to a semiconductor substrate;
- a top layer of metallization (M_top layer) which, among the metallization layers, is most distal to the semiconductor substrate relative to the third direction; and
- a $(p)^{th}$ layer of metallization (M_p layer) which is between the M_1st layer and the M_top layer; and the second parapet is arranged as a stack including:
- conductive segments in each of the M_1st to M_p layers; and
- via structures in each of the corresponding interconnection layers;

relative to the third direction, the metallization layers further include:
- a $(p+1)^{th}$ layer of metallization (layer M_p+1) which is between the M_p layer and the M_top layer, and with none of the metallization layers being between the M_p and M_p+1 layers;
- a $(q)^{th}$ layer of metallization (M_q layer) which is between the M_p+1 layer and the M_top layer; and
- a $(q+1)^{th}$ layer of metallization (M_q+1 layer) which is between the M_q layer and the M_top layer, and with none of the metallization layers being between the M_q and M_q+1 layers; and the semiconductor device further comprises:
- inter-com segment-remnants in each of the M_p+1 to M_q layers, each of the inter-com segment-remnants being correspondingly coupled to the subject region at a first end and open-circuited at a second end, the second end being proximal to a diced edge of the semiconductor device.

16. The semiconductor device of claim 14, wherein the semiconductor device further comprises:
a third parapet on the inter-com stack and which extends from the first side to the third side of the sealing ring, the subject region being between the second side and the third parapet, the second parapet being isolated from the subject region.

17. The semiconductor device of claim 16, wherein the semiconductor device further comprises:
a wall pad on the third parapet; and
wherein:
a long axis of the wall pad is substantially aligned with a long axis of the third parapet; and
relative to the long axis of the wall pad, a perpendicular cross-section of the wall pad has a Y-shape.

18. A semiconductor device comprising:
a subject region including circuitry to be protected;
a sealing ring having first, second and third sides, the sealing ring surrounding, and being isolated from, the subject region; and
a first parapet over a substrate and which extends from the first side to the third side of the sealing ring, the subject region being between the second side and the first parapet, and the first parapet being isolated from the subject region; and
a second parapet over the first parapet and which extends from the first side to the third side of the sealing ring, the subject region being between the second side and the second parapet, the second parapet being isolated from the subject region; and
wherein each of the first parapet and the second parapet includes:
a first conductive segment;
a second conductive segment above the first conductive segment in a height direction of the corresponding parapet; and
a dielectric material between the first conductive segment and the second conductive segment relative to the height direction.

19. The semiconductor device of claim 18, wherein the semiconductor device further comprises:
an input/output (I/O) region of interfacing circuitry coupled to the subject region;
an intra-communication (intra-com) stack including intra-com segments in corresponding metallization layers which are stacked, the intra-com segments correspondingly extending between, and thereby coupling, the subject region and the I/O region; and
a third parapet on the intra-com stack and which extends from the first side to the third side of the sealing ring, the subject region being between the second side and the third parapet, different portions of the subject region.

20. The semiconductor device of claim 18, wherein the semiconductor device further comprises:
a remnant of an inter-communication (inter-com) stack on the first parapet, under the second parapet, wherein:
the first and second conductive segments are remnants of inter-com segments in corresponding stacked metallization layers, the remnants of the inter-com segments extending away from the subject region in a direction away from the second side.

* * * * *